United States Patent
Kiani

(10) Patent No.: US 12,539,046 B2
(45) Date of Patent: Feb. 3, 2026

(54) PHYSIOLOGICAL MONITORING SOUNDBAR

(71) Applicant: MASIMO CORPORATION, Irvine, CA (US)

(72) Inventor: Massi Joe E. Kiani, Laguna Niguel, CA (US)

(73) Assignee: Masimo Corporation, Irvine, CA (US)

( * ) Notice: Subject to any disclaimer, the term of this patent is extended or adjusted under 35 U.S.C. 154(b) by 298 days.

(21) Appl. No.: 18/486,730

(22) Filed: Oct. 13, 2023

(65) Prior Publication Data

US 2024/0122486 A1 Apr. 18, 2024

Related U.S. Application Data

(60) Provisional application No. 63/379,864, filed on Oct. 17, 2022.

(51) Int. Cl.
*A61B 5/0205* (2006.01)
*A61B 5/00* (2006.01)
(Continued)

(52) U.S. Cl.
CPC ........ *A61B 5/02055* (2013.01); *A61B 5/0002* (2013.01); *A61B 5/015* (2013.01); *A61B 5/7405* (2013.01); *A61B 5/742* (2013.01); *A61B 5/7465* (2013.01); *A61B 5/7475* (2013.01); *G01G 19/44* (2013.01); *G06T 7/0012* (2013.01); *G06T 7/60* (2013.01); *G06T 7/70* (2017.01);
(Continued)

(58) Field of Classification Search
CPC ... A61B 5/02055; A61B 5/0002; A61B 5/015; A61B 5/7405; A61B 5/742; A61B 5/7465; A61B 5/7475; A61B 5/4872; A61B 5/4875; A61B 5/4869; A61B 5/0022; A61B 5/02108; A61B 5/02416; A61B 5/029; A61B 5/0816; A61B 5/091; A61B 5/14551; A61B 5/1079; A61B 5/744; G01G 19/44; G01G 19/50; G06T 7/60; G06T 7/70; G06T 2200/24; G06T 2207/10048; G06T 2207/30196; G06T 7/0012–7/0016; G06T 2207/30004–2207/30104; H04R 1/028; H04R 5/02; G16H 50/30

See application file for complete search history.

(56) References Cited

U.S. PATENT DOCUMENTS 4,960,128 A 10/1990 Gordon et al.
4,964,408 A 10/1990 Hink et al.
(Continued)

OTHER PUBLICATIONS

US 2024/0016391 A1, 01/2024, Lapotko et al. (withdrawn)
(Continued)

*Primary Examiner* — Jonathan T Kuo
(74) *Attorney, Agent, or Firm* — Knobbe, Martens, Olson & Bear, LLP

(57) ABSTRACT

A soundbar for medical monitoring which may comprise a speaker, a sensor, and a hardware processor. The speaker can be configured to emit audio signals. The sensor can be configured to obtain sensor data relating to a physiology of a subject. The sensor can include a camera and the sensor data can include image data. The hardware processor can be configured to access the sensor data and determine a health status of the subject based on at least the sensor data.

19 Claims, 2 Drawing Sheets

(51) Int. Cl.
  *A61B 5/01* (2006.01)
  *G01G 19/44* (2006.01)
  *G06T 7/00* (2017.01)
  *G06T 7/60* (2017.01)
  *G06T 7/70* (2017.01)
  *H04R 1/02* (2006.01)

(52) U.S. Cl.
  CPC .............................. G06T 2200/24 (2013.01);
      G06T 2207/10048 (2013.01); G06T
      2207/30004 (2013.01); G06T 2207/30196
      (2013.01); H04R 1/028 (2013.01)

(56) References Cited

U.S. PATENT DOCUMENTS

| | | |
|---|---|---|
| 5,319,355 A | 6/1994 | Russek |
| 5,337,744 A | 8/1994 | Branigan |
| 5,341,805 A | 8/1994 | Stavridi et al. |
| 5,377,676 A | 1/1995 | Vari et al. |
| 5,431,170 A | 7/1995 | Mathews |
| 5,436,499 A | 7/1995 | Namavar et al. |
| 5,456,252 A | 10/1995 | Vari et al. |
| 5,479,934 A | 1/1996 | Imran |
| 5,482,036 A | 1/1996 | Diab et al. |
| 5,494,043 A | 2/1996 | O'Sullivan et al. |
| 5,533,511 A | 7/1996 | Kaspari et al. |
| 5,590,649 A | 1/1997 | Caro et al. |
| 5,602,924 A | 2/1997 | Durand et al. |
| 5,638,816 A | 6/1997 | Kiani-Azarbayjany et al. |
| 5,638,818 A | 6/1997 | Diab et al. |
| 5,645,440 A | 7/1997 | Tobler et al. |
| 5,671,914 A | 9/1997 | Kalkhoran et al. |
| 5,726,440 A | 3/1998 | Kalkhoran et al. |
| D393,830 S | 4/1998 | Tobler et al. |
| 5,743,262 A | 4/1998 | Lepper, Jr. et al. |
| 5,747,806 A | 5/1998 | Khalil et al. |
| 5,750,994 A | 5/1998 | Schlager |
| 5,758,644 A | 6/1998 | Diab et al. |
| 5,760,910 A | 6/1998 | Lepper, Jr. et al. |
| 5,890,929 A | 4/1999 | Mills et al. |
| 5,919,134 A | 7/1999 | Diab |
| 5,987,343 A | 11/1999 | Kinast |
| 5,997,343 A | 12/1999 | Mills et al. |
| 6,002,952 A | 12/1999 | Diab et al. |
| 6,010,937 A | 1/2000 | Karam et al. |
| 6,027,452 A | 2/2000 | Flaherty et al. |
| 6,040,578 A | 3/2000 | Malin et al. |
| 6,066,204 A | 5/2000 | Haven |
| 6,115,673 A | 9/2000 | Malin et al. |
| 6,124,597 A | 9/2000 | Shehada et al. |
| 6,128,521 A | 10/2000 | Marro et al. |
| 6,129,675 A | 10/2000 | Jay |
| 6,144,868 A | 11/2000 | Parker |
| 6,152,754 A | 11/2000 | Gerhardt et al. |
| 6,184,521 B1 | 2/2001 | Coffin, IV et al. |
| 6,232,609 B1 | 5/2001 | Snyder et al. |
| 6,241,683 B1 | 6/2001 | Macklem et al. |
| 6,253,097 B1 | 6/2001 | Aronow et al. |
| 6,255,708 B1 | 7/2001 | Sudharsanan et al. |
| 6,280,381 B1 | 8/2001 | Malin et al. |
| 6,285,896 B1 | 9/2001 | Tobler et al. |
| 6,308,089 B1 | 10/2001 | von der Ruhr et al. |
| 6,317,627 B1 | 11/2001 | Ennen et al. |
| 6,321,100 B1 | 11/2001 | Parker |
| 6,334,065 B1 | 12/2001 | Al-Ali et al. |
| 6,360,114 B1 | 3/2002 | Diab et al. |
| 6,368,283 B1 | 4/2002 | Xu et al. |
| 6,411,373 B1 | 6/2002 | Garside et al. |
| 6,415,167 B1 | 7/2002 | Blank et al. |
| 6,430,437 B1 | 8/2002 | Marro |
| 6,430,525 B1 | 8/2002 | Weber et al. |
| 6,463,311 B1 | 10/2002 | Diab |
| 6,470,199 B1 | 10/2002 | Kopotic et al. |
| 6,487,429 B2 | 11/2002 | Hockersmith et al. |
| 6,505,059 B1 | 1/2003 | Kollias et al. |
| 6,525,386 B1 | 2/2003 | Mills et al. |
| 6,526,300 B1 | 2/2003 | Kiani et al. |
| 6,534,012 B1 | 3/2003 | Hazen et al. |
| 6,542,764 B1 | 4/2003 | Al-Ali et al. |
| 6,580,086 B1 | 6/2003 | Schulz et al. |
| 6,584,336 B1 | 6/2003 | Ali et al. |
| 6,587,196 B1 | 7/2003 | Stippick et al. |
| 6,587,199 B1 | 7/2003 | Luu |
| 6,597,932 B2 | 7/2003 | Tian et al. |
| 6,606,511 B1 | 8/2003 | Ali et al. |
| 6,635,559 B2 | 10/2003 | Greenwald et al. |
| 6,639,668 B1 | 10/2003 | Trepagnier |
| 6,640,116 B2 | 10/2003 | Diab |
| 6,640,117 B2 | 10/2003 | Makarewicz et al. |
| 6,658,276 B2 | 12/2003 | Kiani et al. |
| 6,661,161 B1 | 12/2003 | Lanzo et al. |
| 6,697,656 B1 | 2/2004 | Al-Ali |
| 6,697,658 B2 | 2/2004 | Al-Ali |
| RE38,476 E | 3/2004 | Diab et al. |
| RE38,492 E | 4/2004 | Diab et al. |
| 6,738,652 B2 | 5/2004 | Mattu et al. |
| 6,760,607 B2 | 7/2004 | Al-Ali |
| 6,788,965 B2 | 9/2004 | Ruchti et al. |
| 6,816,241 B2 | 11/2004 | Grubisic |
| 6,822,564 B2 | 11/2004 | Ai-Ali |
| 6,850,787 B2 | 2/2005 | Weber et al. |
| 6,850,788 B2 | 2/2005 | Al-Ali |
| 6,876,931 B2 | 4/2005 | Lorenz et al. |
| 6,920,345 B2 | 7/2005 | Al-Ali et al. |
| 6,934,570 B2 | 8/2005 | Kiani et al. |
| 6,943,348 B1 | 9/2005 | Coffin, IV |
| 6,956,649 B2 | 10/2005 | Acosta et al. |
| 6,961,598 B2 | 11/2005 | Diab |
| 6,970,792 B1 | 11/2005 | Diab |
| 6,985,764 B2 | 1/2006 | Mason et al. |
| 6,990,364 B2 | 1/2006 | Ruchti et al. |
| 6,998,247 B2 | 2/2006 | Monfre et al. |
| 7,003,338 B2 | 2/2006 | Weber et al. |
| 7,015,451 B2 | 3/2006 | Dalke et al. |
| 7,027,849 B2 | 4/2006 | Al-Ali |
| D526,719 S | 8/2006 | Richie, Jr. et al. |
| 7,096,052 B2 | 8/2006 | Mason et al. |
| 7,096,054 B2 | 8/2006 | Abdul-Hafiz et al. |
| D529,616 S | 10/2006 | Deros et al. |
| 7,133,710 B2 | 11/2006 | Acosta et al. |
| 7,142,901 B2 | 11/2006 | Kiani et al. |
| 7,225,006 B2 | 5/2007 | Al-Ali et al. |
| RE39,672 E | 6/2007 | Shehada et al. |
| 7,254,429 B2 | 8/2007 | Schurman et al. |
| 7,254,431 B2 | 8/2007 | Al-Ali et al. |
| 7,254,434 B2 | 8/2007 | Schulz et al. |
| 7,274,955 B2 | 9/2007 | Kiani et al. |
| D554,263 S | 10/2007 | Al-Ali et al. |
| 7,280,858 B2 | 10/2007 | Al-Ali et al. |
| 7,289,835 B2 | 10/2007 | Mansfield et al. |
| 7,292,883 B2 | 11/2007 | De Felice et al. |
| 7,341,559 B2 | 3/2008 | Schulz et al. |
| 7,343,186 B2 | 3/2008 | Lamego et al. |
| D566,282 S | 4/2008 | Al-Ali et al. |
| 7,356,365 B2 | 4/2008 | Schurman |
| 7,371,981 B2 | 5/2008 | Abdul-Hafiz |
| 7,373,193 B2 | 5/2008 | Al-Ali et al. |
| 7,377,794 B2 | 5/2008 | Al-Ali et al. |
| 7,395,158 B2 | 7/2008 | Monfre et al. |
| 7,415,297 B2 | 8/2008 | Al-Ali et al. |
| 7,438,683 B2 | 10/2008 | Al-Ali et al. |
| 7,483,729 B2 | 1/2009 | Al-Ali et al. |
| D587,657 S | 3/2009 | Al-Ali et al. |
| 7,500,950 B2 | 3/2009 | Al-Ali et al. |
| 7,509,494 B2 | 3/2009 | Ai-Ali |
| 7,510,849 B2 | 3/2009 | Schurman et al. |
| 7,514,725 B2 | 4/2009 | Wojtczuk et al. |
| 7,519,406 B2 | 4/2009 | Blank et al. |
| D592,507 S | 5/2009 | Wachman et al. |
| 7,530,942 B1 | 5/2009 | Diab |
| 7,593,230 B2 | 9/2009 | Abul-Haj et al. |
| 7,596,398 B2 | 9/2009 | Al-Ali et al. |
| 7,606,608 B2 | 10/2009 | Blank et al. |
| 7,620,674 B2 | 11/2009 | Ruchti et al. |
| D606,659 S | 12/2009 | Kiani et al. |

(56) References Cited

U.S. PATENT DOCUMENTS

| | | |
|---|---|---|
| 7,629,039 B2 | 12/2009 | Eckerbom et al. |
| 7,640,140 B2 | 12/2009 | Ruchti et al. |
| 7,647,083 B2 | 1/2010 | Al-Ali et al. |
| D609,193 S | 2/2010 | Al-Ali et al. |
| D614,305 S | 4/2010 | Al-Ali et al. |
| 7,697,966 B2 | 4/2010 | Monfre et al. |
| 7,698,105 B2 | 4/2010 | Ruchti et al. |
| RE41,317 E | 5/2010 | Parker |
| RE41,333 E | 5/2010 | Blank et al. |
| 7,729,733 B2 | 6/2010 | Al-Ali et al. |
| 7,761,127 B2 | 7/2010 | Al-Ali et al. |
| 7,764,982 B2 | 7/2010 | Dalke et al. |
| D621,516 S | 8/2010 | Kiani et al. |
| 7,791,155 B2 | 9/2010 | Diab |
| RE41,912 E | 11/2010 | Parker |
| 7,880,626 B2 | 2/2011 | Al-Ali et al. |
| 7,909,772 B2 | 3/2011 | Popov et al. |
| 7,919,713 B2 | 4/2011 | Al-Ali et al. |
| 7,937,128 B2 | 5/2011 | Al-Ali |
| 7,937,129 B2 | 5/2011 | Mason et al. |
| 7,941,199 B2 | 5/2011 | Kiani |
| 7,957,780 B2 | 6/2011 | Lamego et al. |
| 7,962,188 B2 | 6/2011 | Kiani et al. |
| 7,976,472 B2 | 7/2011 | Kiani |
| 7,990,382 B2 | 8/2011 | Kiani |
| 8,008,088 B2 | 8/2011 | Bellott et al. |
| RE42,753 E | 9/2011 | Kiani-Azarbayjany et al. |
| 8,028,701 B2 | 10/2011 | Al-Ali et al. |
| 8,048,040 B2 | 11/2011 | Kiani |
| 8,050,728 B2 | 11/2011 | Al-Ali et al. |
| RE43,169 E | 2/2012 | Parker |
| 8,118,620 B2 | 2/2012 | Al-Ali et al. |
| 8,130,105 B2 | 3/2012 | Al-Ali et al. |
| 8,182,443 B1 | 5/2012 | Kiani |
| 8,190,223 B2 | 5/2012 | Al-Ali et al. |
| 8,203,438 B2 | 6/2012 | Kiani et al. |
| 8,203,704 B2 | 6/2012 | Merritt et al. |
| 8,219,172 B2 | 7/2012 | Schurman et al. |
| 8,224,411 B2 | 7/2012 | Al-Ali et al. |
| 8,229,532 B2 | 7/2012 | Davis |
| 8,233,955 B2 | 7/2012 | Al-Ali et al. |
| 8,255,026 B1 | 8/2012 | Al-Ali |
| 8,265,723 B1 | 9/2012 | McHale et al. |
| 8,274,360 B2 | 9/2012 | Sampath et al. |
| 8,280,473 B2 | 10/2012 | Al-Ali |
| 8,315,683 B2 | 11/2012 | Al-Ali et al. |
| RE43,860 E | 12/2012 | Parker |
| 8,346,330 B2 | 1/2013 | Lamego |
| 8,353,842 B2 | 1/2013 | Al-Ali et al. |
| 8,355,766 B2 | 1/2013 | MacNeish, III et al. |
| 8,374,665 B2 | 2/2013 | Lamego |
| 8,388,353 B2 | 3/2013 | Kiani et al. |
| 8,401,602 B2 | 3/2013 | Kiani |
| 8,414,499 B2 | 4/2013 | Al-Ali et al. |
| 8,418,524 B2 | 4/2013 | Al-Ali |
| 8,428,967 B2 | 4/2013 | Olsen et al. |
| 8,430,817 B1 | 4/2013 | Al-Ali et al. |
| 8,437,825 B2 | 5/2013 | Dalvi et al. |
| 8,455,290 B2 | 6/2013 | Siskavich |
| 8,457,707 B2 | 6/2013 | Kiani |
| 8,471,713 B2 | 6/2013 | Poeze et al. |
| 8,473,020 B2 | 6/2013 | Kiani et al. |
| 8,509,867 B2 | 8/2013 | Workman et al. |
| 8,515,509 B2 | 8/2013 | Bruinsma et al. |
| 8,523,781 B2 | 9/2013 | Al-Ali |
| D692,145 S | 10/2013 | Al-Ali et al. |
| 8,571,617 B2 | 10/2013 | Reichgott et al. |
| 8,571,618 B1 | 10/2013 | Lamego et al. |
| 8,571,619 B2 | 10/2013 | Al-Ali et al. |
| 8,577,431 B2 | 11/2013 | Lamego et al. |
| 8,584,345 B2 | 11/2013 | Al-Ali et al. |
| 8,588,880 B2 | 11/2013 | Abdul-Hafiz et al. |
| 8,630,691 B2 | 1/2014 | Lamego et al. |
| 8,641,631 B2 | 2/2014 | Sierra et al. |
| 8,652,060 B2 | 2/2014 | Al-Ali |
| 8,666,468 B1 | 3/2014 | Al-Ali |
| 8,670,811 B2 | 3/2014 | O'Reilly |
| RE44,823 E | 4/2014 | Parker |
| RE44,875 E | 4/2014 | Kiani et al. |
| 8,688,183 B2 | 4/2014 | Bruinsma et al. |
| 8,690,799 B2 | 4/2014 | Telfort et al. |
| 8,702,627 B2 | 4/2014 | Telfort et al. |
| 8,712,494 B1 | 4/2014 | MacNeish, III et al. |
| 8,715,206 B2 | 5/2014 | Telfort et al. |
| 8,723,677 B1 | 5/2014 | Kiani |
| 8,740,792 B1 | 6/2014 | Kiani et al. |
| 8,755,535 B2 | 6/2014 | Telfort et al. |
| 8,755,872 B1 | 6/2014 | Marinow |
| 8,764,671 B2 | 7/2014 | Kiani |
| 8,768,423 B2 | 7/2014 | Shakespeare et al. |
| 8,771,204 B2 | 7/2014 | Telfort et al. |
| 8,781,544 B2 | 7/2014 | Al-Ali et al. |
| 8,790,268 B2 | 7/2014 | Al-Ali |
| 8,801,613 B2 | 8/2014 | Al-Ali et al. |
| 8,821,397 B2 | 9/2014 | Al-Ali et al. |
| 8,821,415 B2 | 9/2014 | Al-Ali et al. |
| 8,830,449 B1 | 9/2014 | Lamego et al. |
| 8,840,549 B2 | 9/2014 | Al-Ali et al. |
| 8,852,094 B2 | 10/2014 | Al-Ali et al. |
| 8,852,994 B2 | 10/2014 | Wojtczuk et al. |
| 8,897,847 B2 | 11/2014 | Al-Ali |
| 8,911,377 B2 | 12/2014 | Al-Ali |
| 8,989,831 B2 | 3/2015 | Al-Ali et al. |
| 8,998,809 B2 | 4/2015 | Kiani |
| 9,066,666 B2 | 6/2015 | Kiani |
| 9,066,680 B1 | 6/2015 | Al-Ali et al. |
| 9,095,316 B2 | 8/2015 | Welch et al. |
| 9,106,038 B2 | 8/2015 | Telfort et al. |
| 9,107,625 B2 | 8/2015 | Telfort et al. |
| 9,131,881 B2 | 9/2015 | Diab et al. |
| 9,138,180 B1 | 9/2015 | Coverston et al. |
| 9,153,112 B1 | 10/2015 | Kiani et al. |
| 9,192,329 B2 | 11/2015 | Al-Ali |
| 9,192,351 B1 | 11/2015 | Telfort et al. |
| 9,195,385 B2 | 11/2015 | Al-Ali et al. |
| 9,211,095 B1 | 12/2015 | Al-Ali |
| 9,218,454 B2 | 12/2015 | Kiani et al. |
| 9,245,668 B1 | 1/2016 | Vo et al. |
| 9,267,572 B2 | 2/2016 | Barker et al. |
| 9,277,880 B2 | 3/2016 | Poeze et al. |
| 9,307,928 B1 | 4/2016 | Al-Ali et al. |
| 9,323,894 B2 | 4/2016 | Kiani |
| D755,392 S | 5/2016 | Hwang et al. |
| 9,326,712 B1 | 5/2016 | Kiani |
| 9,392,945 B2 | 7/2016 | Al-Ali et al. |
| 9,408,542 B1 | 8/2016 | Kinast et al. |
| 9,436,645 B2 | 9/2016 | Al-Ali et al. |
| 9,445,759 B1 | 9/2016 | Lamego et al. |
| 9,474,474 B2 | 10/2016 | Lamego et al. |
| 9,480,435 B2 | 11/2016 | Olsen |
| 9,510,779 B2 | 12/2016 | Poeze et al. |
| 9,517,024 B2 | 12/2016 | Kiani et al. |
| 9,532,722 B2 | 1/2017 | Lamego et al. |
| 9,560,996 B2 | 2/2017 | Kiani |
| 9,579,039 B2 | 2/2017 | Jansen et al. |
| 9,622,692 B2 | 4/2017 | Lamego et al. |
| D788,312 S | 5/2017 | Al-Ali et al. |
| 9,649,054 B2 | 5/2017 | Lamego et al. |
| 9,697,928 B2 | 7/2017 | Al-Ali et al. |
| 9,717,458 B2 | 8/2017 | Lamego et al. |
| 9,724,016 B1 | 8/2017 | Al-Ali et al. |
| 9,724,024 B2 | 8/2017 | Al-Ali |
| 9,724,025 B1 | 8/2017 | Kiani et al. |
| 9,749,232 B2 | 8/2017 | Sampath et al. |
| 9,750,442 B2 | 9/2017 | Olsen |
| 9,750,461 B1 | 9/2017 | Telfort |
| 9,775,545 B2 | 10/2017 | Al-Ali et al. |
| 9,778,079 B1 | 10/2017 | Al-Ali et al. |
| 9,782,077 B2 | 10/2017 | Lamego et al. |
| 9,787,568 B2 | 10/2017 | Lamego et al. |
| 9,808,188 B1 | 11/2017 | Perea et al. |
| 9,838,508 B2 * | 12/2017 | Salem .................. G16H 40/67 |
| 9,839,379 B2 | 12/2017 | Al-Ali et al. |
| 9,839,381 B1 | 12/2017 | Weber et al. |

(56) References Cited

U.S. PATENT DOCUMENTS

| | | |
|---|---|---|
| 9,847,749 B2 | 12/2017 | Kiani et al. |
| 9,848,800 B1 | 12/2017 | Lee et al. |
| 9,861,298 B2 | 1/2018 | Eckerbom et al. |
| 9,861,305 B1 | 1/2018 | Weber et al. |
| 9,877,650 B2 | 1/2018 | Muhsin et al. |
| 9,891,079 B2 | 2/2018 | Dalvi |
| 9,924,897 B1 | 3/2018 | Abdul-Hafiz |
| 9,936,917 B2 | 4/2018 | Poeze et al. |
| 9,955,937 B2 | 5/2018 | Telfort |
| 9,965,946 B2 | 5/2018 | Al-Ali et al. |
| D820,865 S | 6/2018 | Muhsin et al. |
| 9,986,952 B2 | 6/2018 | Dalvi et al. |
| D822,215 S | 7/2018 | Al-Ali et al. |
| D822,216 S | 7/2018 | Barker et al. |
| 10,010,276 B2 | 7/2018 | Al-Ali et al. |
| 10,086,138 B1 | 10/2018 | Novak, Jr. |
| 10,111,591 B2 | 10/2018 | Dyell et al. |
| D833,624 S | 11/2018 | DeJong et al. |
| 10,123,729 B2 | 11/2018 | Dyell et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| 10,188,348 B2 | 1/2019 | Al-Ali et al. |
| RE47,218 E | 2/2019 | Al-Ali |
| RE47,244 E | 2/2019 | Kiani et al. |
| RE47,249 E | 2/2019 | Kiani et al. |
| 10,205,291 B2 | 2/2019 | Scruggs et al. |
| 10,226,187 B2 | 3/2019 | Al-Ali et al. |
| 10,231,657 B2 | 3/2019 | Al-Ali et al. |
| 10,231,670 B2 | 3/2019 | Blank et al. |
| RE47,353 E | 4/2019 | Kiani et al. |
| 10,279,247 B2 | 5/2019 | Kiani |
| 10,292,664 B2 | 5/2019 | Al-Ali |
| 10,299,720 B2 | 5/2019 | Brown et al. |
| 10,327,337 B2 | 6/2019 | Schmidt et al. |
| 10,327,713 B2 | 6/2019 | Barker et al. |
| 10,332,630 B2 | 6/2019 | Al-Ali |
| 10,383,520 B2 | 8/2019 | Wojtczuk et al. |
| 10,383,527 B2 | 8/2019 | Al-Ali |
| 10,388,120 B2 | 8/2019 | Muhsin et al. |
| D864,120 S | 10/2019 | Forrest et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,871 B2 | 10/2019 | Al-Ali et al. |
| 10,456,038 B2 | 10/2019 | Lamego et al. |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| 10,524,738 B2 | 1/2020 | Olsen |
| 10,532,174 B2 | 1/2020 | Al-Ali |
| 10,537,285 B2 | 1/2020 | Shreim et al. |
| 10,542,903 B2 | 1/2020 | Al-Ali et al. |
| 10,555,678 B2 | 2/2020 | Dalvi et al. |
| 10,568,553 B2 | 2/2020 | O'Neil et al. |
| 10,608,817 B2 | 3/2020 | Haider et al. |
| D880,477 S | 4/2020 | Forrest et al. |
| 10,617,302 B2 | 4/2020 | Al-Ali et al. |
| 10,617,335 B2 | 4/2020 | Al-Ali et al. |
| 10,637,181 B2 | 4/2020 | Al-Ali et al. |
| D886,849 S | 6/2020 | Muhsin et al. |
| D887,548 S | 6/2020 | Abdul-Hafiz et al. |
| D887,549 S | 6/2020 | Abdul-Hafiz et al. |
| 10,667,764 B2 | 6/2020 | Ahmed et al. |
| D890,708 S | 7/2020 | Forrest et al. |
| 10,721,785 B2 | 7/2020 | Al-Ali |
| 10,728,683 B2 * | 7/2020 | Shi ............... G06T 7/73 |
| 10,736,518 B2 | 8/2020 | Al-Ali et al. |
| 10,750,984 B2 | 8/2020 | Pauley et al. |
| D897,098 S | 9/2020 | Al-Ali |
| 10,779,098 B2 | 9/2020 | Iswanto et al. |
| 10,789,725 B2 * | 9/2020 | Segman ............... G06T 7/149 |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,849,554 B2 | 12/2020 | Shreim et al. |
| 10,856,750 B2 | 12/2020 | Indorf et al. |
| D906,970 S | 1/2021 | Forrest et al. |
| D908,213 S | 1/2021 | Abdul-Hafiz et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D917,046 S | 4/2021 | Abdul-Hafiz et al. |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| 11,006,867 B2 | 5/2021 | Al-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| D927,699 S | 8/2021 | Al-Ali et al. |
| 11,076,777 B2 | 8/2021 | Lee et al. |
| 11,114,188 B2 | 9/2021 | Poeze et al. |
| D933,232 S | 10/2021 | Al-Ali et al. |
| D933,233 S | 10/2021 | Al-Ali et al. |
| D933,234 S | 10/2021 | Al-Ali et al. |
| 11,145,408 B2 | 10/2021 | Sampath et al. |
| 11,147,518 B1 | 10/2021 | Al-Ali et al. |
| 11,185,262 B2 | 11/2021 | Al-Ali et al. |
| 11,191,484 B2 | 12/2021 | Kiani et al. |
| D946,596 S | 3/2022 | Ahmed |
| D946,597 S | 3/2022 | Ahmed |
| D946,598 S | 3/2022 | Ahmed |
| D946,617 S | 3/2022 | Ahmed |
| 11,272,839 B2 | 3/2022 | Al-Ali et al. |
| 11,289,199 B2 | 3/2022 | Al-Ali |
| RE49,034 E | 4/2022 | Al-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| D957,648 S | 7/2022 | Al-Ali |
| 11,382,567 B2 | 7/2022 | O'Brien et al. |
| 11,389,093 B2 | 7/2022 | Triman et al. |
| 11,406,286 B2 | 8/2022 | Al-Ali et al. |
| 11,417,426 B2 | 8/2022 | Muhsin et al. |
| 11,439,329 B2 | 9/2022 | Lamego |
| 11,445,948 B2 | 9/2022 | Scruggs et al. |
| 11,446,466 B1 * | 9/2022 | Shvartzman ......... A61B 5/4809 |
| D965,789 S | 10/2022 | Al-Ali et al. |
| D967,433 S | 10/2022 | Al-Ali et al. |
| 11,464,410 B2 | 10/2022 | Muhsin |
| 11,504,058 B1 | 11/2022 | Sharma et al. |
| 11,504,066 B1 | 11/2022 | Dalvi et al. |
| D971,933 S | 12/2022 | Ahmed |
| D973,072 S | 12/2022 | Ahmed |
| D973,685 S | 12/2022 | Ahmed |
| D973,686 S | 12/2022 | Ahmed |
| D974,193 S | 1/2023 | Forrest et al. |
| D979,516 S | 2/2023 | Al-Ali et al. |
| D980,091 S | 3/2023 | Forrest et al. |
| 11,596,363 B2 | 3/2023 | Lamego |
| 11,627,919 B2 | 4/2023 | Kiani et al. |
| 11,637,437 B2 | 4/2023 | Al-Ali et al. |
| D985,498 S | 5/2023 | Al-Ali et al. |
| 11,653,862 B2 | 5/2023 | Dalvi et al. |
| D989,112 S | 6/2023 | Muhsin et al. |
| D989,327 S | 6/2023 | Al-Ali et al. |
| 11,678,829 B2 | 6/2023 | Al-Ali et al. |
| 11,679,579 B2 | 6/2023 | Al-Ali |
| 11,684,296 B2 | 6/2023 | Vo et al. |
| 11,692,934 B2 | 7/2023 | Normand et al. |

(56) References Cited

U.S. PATENT DOCUMENTS

| | | |
|---|---|---|
| 11,701,043 B2 | 7/2023 | Al-Ali et al. |
| D997,365 S | 8/2023 | Hwang |
| 11,721,105 B2 | 8/2023 | Ranasinghe et al. |
| 11,730,379 B2 | 8/2023 | Ahmed et al. |
| D998,625 S | 9/2023 | Indorf et al. |
| D998,630 S | 9/2023 | Indorf et al. |
| D998,631 S | 9/2023 | Indorf et al. |
| D999,244 S | 9/2023 | Indorf et al. |
| D999,245 S | 9/2023 | Indorf et al. |
| D999,246 S | 9/2023 | Indorf et al. |
| 11,766,198 B2 | 9/2023 | Pauley et al. |
| D1,000,975 S | 10/2023 | Al-Ali et al. |
| 11,803,623 B2 | 10/2023 | Kiani et al. |
| 11,832,940 B2 | 12/2023 | Diab et al. |
| D1,013,179 S | 1/2024 | Al-Ali et al. |
| 11,872,156 B2 | 1/2024 | Telfort et al. |
| 11,879,960 B2 | 1/2024 | Ranasinghe et al. |
| 11,883,129 B2 | 1/2024 | Olsen |
| D1,022,729 S | 4/2024 | Forrest et al. |
| 11,951,186 B2 | 4/2024 | Krishnamani et al. |
| 11,974,833 B2 | 5/2024 | Forrest et al. |
| 11,986,067 B2 | 5/2024 | Al-Ali et al. |
| 11,986,289 B2 | 5/2024 | Dalvi et al. |
| 11,986,305 B2 | 5/2024 | Al-Ali et al. |
| 2001/0034477 A1 | 10/2001 | Mansfield et al. |
| 2001/0039483 A1 | 11/2001 | Brand et al. |
| 2002/0010401 A1 | 1/2002 | Bushmakin et al. |
| 2002/0058864 A1 | 5/2002 | Mansfield et al. |
| 2002/0133080 A1 | 9/2002 | Apruzzese et al. |
| 2003/0013975 A1 | 1/2003 | Kiani |
| 2003/0018243 A1 | 1/2003 | Gerhardt et al. |
| 2003/0144582 A1 | 7/2003 | Cohen et al. |
| 2003/0156288 A1 | 8/2003 | Barnum et al. |
| 2003/0212312 A1 | 11/2003 | Coffin, IV et al. |
| 2004/0106163 A1 | 6/2004 | Workman, Jr. et al. |
| 2005/0055276 A1 | 3/2005 | Kiani et al. |
| 2005/0234317 A1 | 10/2005 | Kiani |
| 2006/0073719 A1 | 4/2006 | Kiani |
| 2006/0189871 A1 | 8/2006 | Al-Ali et al. |
| 2007/0073116 A1 | 3/2007 | Kiani et al. |
| 2007/0180140 A1 | 8/2007 | Welch et al. |
| 2007/0244377 A1 | 10/2007 | Cozad et al. |
| 2008/0064965 A1 | 3/2008 | Jay et al. |
| 2008/0094228 A1 | 4/2008 | Welch et al. |
| 2008/0103375 A1 | 5/2008 | Kiani |
| 2008/0221418 A1 | 9/2008 | Al-Ali et al. |
| 2009/0036759 A1 | 2/2009 | Ault et al. |
| 2009/0093687 A1 | 4/2009 | Telfort et al. |
| 2009/0095926 A1 | 4/2009 | MacNeish, III |
| 2009/0247984 A1 | 10/2009 | Lamego et al. |
| 2009/0275844 A1 | 11/2009 | Al-Ali |
| 2010/0004518 A1 | 1/2010 | Vo et al. |
| 2010/0030040 A1 | 2/2010 | Poeze et al. |
| 2010/0099964 A1 | 4/2010 | O'Reilly et al. |
| 2010/0234718 A1 | 9/2010 | Sampath et al. |
| 2010/0270257 A1 | 10/2010 | Wachman et al. |
| 2011/0028806 A1 | 2/2011 | Merritt et al. |
| 2011/0028809 A1 | 2/2011 | Goodman |
| 2011/0040197 A1 | 2/2011 | Welch et al. |
| 2011/0082711 A1 | 4/2011 | Poeze et al. |
| 2011/0087081 A1 | 4/2011 | Kiani et al. |
| 2011/0118561 A1 | 5/2011 | Tari et al. |
| 2011/0137297 A1 | 6/2011 | Kiani et al. |
| 2011/0172498 A1 | 7/2011 | Olsen et al. |
| 2012/0123231 A1 | 5/2012 | O'Reilly |
| 2012/0165629 A1 | 6/2012 | Merritt et al. |
| 2012/0209084 A1 | 8/2012 | Olsen et al. |
| 2012/0226117 A1 | 9/2012 | Lamego et al. |
| 2012/0283524 A1 | 11/2012 | Kiani et al. |
| 2013/0023775 A1 | 1/2013 | Lamego et al. |
| 2013/0060147 A1 | 3/2013 | Welch et al. |
| 2013/0096405 A1 | 4/2013 | Garfio |
| 2013/0296672 A1 | 11/2013 | O'Neil et al. |
| 2013/0345921 A1 | 12/2013 | Al-Ali et al. |
| 2014/0166076 A1 | 6/2014 | Kiani et al. |
| 2014/0180160 A1 | 6/2014 | Brown et al. |
| 2014/0187973 A1 | 7/2014 | Brown et al. |
| 2014/0275871 A1 | 9/2014 | Lamego et al. |
| 2014/0275872 A1 | 9/2014 | Merritt et al. |
| 2014/0316217 A1 | 10/2014 | Purdon et al. |
| 2014/0316218 A1 | 10/2014 | Purdon et al. |
| 2014/0323897 A1 | 10/2014 | Brown et al. |
| 2014/0323898 A1 | 10/2014 | Purdon et al. |
| 2015/0005600 A1 | 1/2015 | Blank et al. |
| 2015/0011907 A1 | 1/2015 | Purdon et al. |
| 2015/0073241 A1 | 3/2015 | Lamego |
| 2015/0080754 A1 | 3/2015 | Purdon et al. |
| 2015/0099950 A1 | 4/2015 | Al-Ali et al. |
| 2016/0080527 A1* | 3/2016 | Salem .................... G16H 50/30 709/219 |
| 2017/0024748 A1 | 1/2017 | Haider |
| 2017/0115157 A1* | 4/2017 | Yokota .................. G01G 19/50 |
| 2017/0251974 A1 | 9/2017 | Shreim et al. |
| 2018/0242926 A1 | 8/2018 | Muhsin et al. |
| 2018/0247712 A1 | 8/2018 | Muhsin et al. |
| 2019/0075418 A1* | 3/2019 | Shi ........................ H04S 7/303 |
| 2019/0162439 A1* | 5/2019 | Tsuda ................... A61B 5/4872 |
| 2019/0320906 A1 | 10/2019 | Olsen |
| 2019/0325599 A1* | 10/2019 | Segman ................... G06T 7/13 |
| 2020/0060869 A1 | 2/2020 | Telfort et al. |
| 2020/0111552 A1 | 4/2020 | Ahmed |
| 2020/0113520 A1 | 4/2020 | Abdul-Hafiz et al. |
| 2020/0138368 A1 | 5/2020 | Kiani et al. |
| 2020/0163597 A1 | 5/2020 | Dalvi et al. |
| 2020/0253474 A1 | 8/2020 | Muhsin et al. |
| 2020/0253544 A1 | 8/2020 | Belur Nagaraj et al. |
| 2020/0275841 A1 | 9/2020 | Telfort et al. |
| 2020/0288983 A1 | 9/2020 | Telfort et al. |
| 2020/0329983 A1 | 10/2020 | Al-Ali et al. |
| 2020/0329993 A1 | 10/2020 | Al-Ali et al. |
| 2021/0022628 A1 | 1/2021 | Telfort et al. |
| 2021/0104173 A1 | 4/2021 | Pauley et al. |
| 2021/0117525 A1 | 4/2021 | Kiani et al. |
| 2021/0121582 A1 | 4/2021 | Krishnamani et al. |
| 2021/0161465 A1 | 6/2021 | Barker et al. |
| 2021/0236729 A1 | 8/2021 | Kiani et al. |
| 2021/0256835 A1 | 8/2021 | Ranasinghe et al. |
| 2021/0275101 A1 | 9/2021 | Vo et al. |
| 2021/0290072 A1 | 9/2021 | Forrest |
| 2021/0290080 A1 | 9/2021 | Ahmed |
| 2021/0290120 A1 | 9/2021 | Al-Ali |
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0330228 A1 | 10/2021 | Olsen et al. |
| 2021/0386382 A1 | 12/2021 | Olsen et al. |
| 2021/0402110 A1 | 12/2021 | Pauley et al. |
| 2022/0039707 A1 | 2/2022 | Sharma et al. |
| 2022/0053892 A1 | 2/2022 | Al-Ali et al. |
| 2022/0071562 A1 | 3/2022 | Kiani |
| 2022/0096603 A1 | 3/2022 | Kiani et al. |
| 2022/0151521 A1 | 5/2022 | Krishnamani et al. |
| 2022/0218244 A1 | 7/2022 | Kiani et al. |
| 2022/0287574 A1 | 9/2022 | Telfort et al. |
| 2022/0296161 A1 | 9/2022 | Al-Ali et al. |
| 2022/0361819 A1 | 11/2022 | Al-Ali et al. |
| 2022/0379059 A1 | 12/2022 | Yu et al. |
| 2022/0392610 A1 | 12/2022 | Kiani et al. |
| 2023/0028745 A1 | 1/2023 | Al-Ali |
| 2023/0038389 A1 | 2/2023 | Vo |
| 2023/0045647 A1 | 2/2023 | Vo |
| 2023/0058052 A1 | 2/2023 | Al-Ali |
| 2023/0058342 A1 | 2/2023 | Kiani |
| 2023/0069789 A1 | 3/2023 | Koo et al. |
| 2023/0087671 A1 | 3/2023 | Telfort et al. |
| 2023/0110152 A1 | 4/2023 | Forrest et al. |
| 2023/0111198 A1 | 4/2023 | Yu et al. |
| 2023/0115397 A1 | 4/2023 | Vo et al. |
| 2023/0116371 A1 | 4/2023 | Mills et al. |
| 2023/0135297 A1 | 5/2023 | Kiani et al. |
| 2023/0138098 A1 | 5/2023 | Telfort et al. |
| 2023/0145155 A1 | 5/2023 | Krishnamani et al. |
| 2023/0147750 A1 | 5/2023 | Barker et al. |
| 2023/0210417 A1 | 7/2023 | Al-Ali et al. |

(56) References Cited

U.S. PATENT DOCUMENTS

| | | |
|---|---|---|
| 2023/0222805 A1 | 7/2023 | Muhsin et al. |
| 2023/0222887 A1 | 7/2023 | Muhsin et al. |
| 2023/0226331 A1 | 7/2023 | Kiani et al. |
| 2023/0284916 A1 | 9/2023 | Telfort |
| 2023/0284943 A1 | 9/2023 | Scruggs et al. |
| 2023/0301562 A1 | 9/2023 | Scruggs et al. |
| 2023/0346993 A1 | 11/2023 | Kiani et al. |
| 2023/0368221 A1 | 11/2023 | Haider |
| 2023/0371893 A1 | 11/2023 | Al-Ali et al. |
| 2023/0389837 A1 | 12/2023 | Krishnamani et al. |
| 2024/0008839 A1* | 1/2024 | Yoo .................. A61B 5/015 |
| 2024/0016418 A1 | 1/2024 | Devadoss et al. |
| 2024/0016419 A1 | 1/2024 | Devadoss et al. |
| 2024/0047061 A1 | 2/2024 | Al-Ali et al. |
| 2024/0049310 A1 | 2/2024 | Al-Ali et al. |
| 2024/0049986 A1 | 2/2024 | Al-Ali et al. |
| 2024/0081656 A1 | 3/2024 | DeJong et al. |
| 2024/0180456 A1 | 6/2024 | Al-Ali |

OTHER PUBLICATIONS

Merriam-Webster, soundbar, accessed Sep. 16, 2025, https://www.merriam-webster.com/dictionary/soundbar (Year: 2025).*

\* cited by examiner

PHYSIOLOGICAL MONITORING SOUNDBAR

INCORPORATION BY REFERENCE TO ANY PRIORITY APPLICATIONS

Any and all applications, if any, for which a foreign or domestic priority claim is identified in the Application Data Sheet of the present application are hereby incorporated by reference under 37 CFR 1.57.

FIELD OF TRE DISCLOSURE

The present disclosure relates to medical monitoring. Specifically, the disclosure describes, among other things, devices, systems, and methods for monitoring and/or displaying information regarding a user's physiological information.

BACKGROUND

Soundbars are used to play audio signals such as music. Devices, such as scales can determine physiological related data of a subject. Scales can determine a subject's weight and/or body mass index (BMI). Current determinations of BMI are based on limited information such as a subject's weight and percent body fat.

SUMMARY

Various embodiments of systems, methods and devices within the scope of the appended claims each have several aspects, no single one of which is solely responsible for the desirable attributes described herein. Without limiting the scope of the appended claims, the description below describes some prominent features.

Details of one or more embodiments of the subject matter described in this specification are set forth in the accompanying drawings and the description below. Other features, aspects, and advantages will become apparent from the description, the drawings, and the claims. Note that relative dimensions of the following figures may not be drawn to scale.

A soundbar for monitoring a physiological health of a user can comprise a speaker, a sensor, and one or more hardware processors. The speaker can emit audio which can comprise one or more of music, an alert, information relating to a physiology of the user, or instructions to the user. The sensor can obtain sensor data as the user is within a proximity of the soundbar. The sensor can comprise one or more cameras configured to capture electromagnetic radiation including infrared radiation and visible light radiation. The sensor data can comprise image data of the user and can relate to a physiology of the user. The one or more hardware processors can determine a distribution of body heat of the user based on at least the image data of the user. The image data can comprise infrared image data indicating thermal energy. The one or more hardware processors can determine a distribution of body weight of the user based on at least the image data of the user. The image data can comprise visible light image data. The one or more hardware processors can determine a health index of the user from at least the distribution of body weight of the user or the distribution of body heat of the user.

In some implementations, the sensor can obtain the sensor data comprising the image data of the user as the user rotates in front of the soundbar, the image data of the user corresponding to a plurality of portions of the user's body.

In some implementations, the soundbar can further comprise a communication component configured to communicate with one or more computing devices. The one or more computing devices can include a scale configured to measure a weight of the user. The one or more hardware processors can generate one or more instructions to the scale to cause the scale to rotate as the user stands on the scale and cause the sensor to obtain the sensor data as the scale rotates.

In some implementations, the soundbar can further comprise a communication component configured to communicate with one or more computing devices. The one or more computing devices can include a scale configured to measure a weight of the user. The one or more hardware processors can access scale data obtained from the scale by the communication component, the scale data including at least a weight of the user; and determine the health index of the user based on at least the scale data.

In some implementations, the scale data further includes at least one or more of a percent body fat of the user, a percent lean muscle mass of the user, a percent water of the user, a BMI of the user, a change in weight of the user, or ECG data of the user.

In some implementations, the one or more hardware processors is further configured to determine a likelihood the user has an infectious disease based on at least the distribution of body heat of the user, the distribution of body heat of the user indicating a body temperature of the user, the infectious disease comprising a virus.

In some implementations, the one or more hardware processors is further configured to process the image data to generate PPG data and determine one or more physiological parameters based on the PPG data.

In some implementations, the one or more hardware processors is further configured to cause the speaker to emit one or more of an instruction to the user or information relating to the health index of the user.

In some implementations, the soundbar further comprises a communication component configured to communicate with one or more computing devices, the one or more computing devices including a display, and the one or more hardware processors is further configured to: generate user interface data for rendering one or more user interfaces comprising indicia of the health index of the user; and cause the communication component to communicate the user interface data to the display to render the one or more user interfaces.

In some implementations, the one or more user interfaces further comprises one or more images corresponding to the image data of the user, the one or more images comprising one or more historical images or one or more real-time images.

In some implementations, the soundbar further comprises a communication component configured to communicate with one or more computing devices, the one or more computing devices including a scale configured to measure a weight of the user, and the one or more hardware processors is further configured to: cause the sensor to turn on or to obtain the sensor data responsive to one or more signals received from the scale by the communication component, the one or more signals generated by the scale responsive to a user standing on the scale.

In some implementations, the one or more hardware processors is further configured to: determine the distribution of body heat of the user based on at least the image data of the user, the image data comprising historical image data or real-time image data; and determine the distribution of body weight of the user based on at least the image data of the user, the image data comprising historical image data or real-time image data.

In some implementations, the one or more cameras comprise one or more of a plurality of cameras, a 3D camera, a depth camera, a stereovision camera, an infrared camera, or a light detection and ranging (LIDAR) sensor.

In some implementations, the one or more hardware processors is further configured to cause the one or more cameras to adjust a view of the one or more cameras, wherein adjusting the view of the one or more cameras comprises one or more of rotating the one or more cameras, adjusting a zoom of the one or more cameras, pivoting the one or more cameras, tilting the one or more cameras, or panning the one or more cameras.

In some implementations, the one or more hardware processors is further configured to cause a communication component of the soundbar to implement wireless communication with a remote computing device to establish a video call; cause the communication component to transmit the image data of the user to the remote computing device; and generate user interface data for rendering one or more user interfaces comprising one or more images received from the remote computing device by the communication component.

A method for monitoring a health of a user can comprise: accessing sensor data originating from a sensor of a soundbar, the sensor comprising one or more cameras configured to capture electromagnetic radiation including infrared radiation and visible light radiation, the sensor data comprising image data of the user and relating to a physiology of the user; determining a distribution of body heat of the user based on at least the image data of the user, the image data comprising infrared image data indicating thermal energy; determining a distribution of body weight of the user based on at least the image data of the user, the image data comprising visible light image data; determining a health index of the user from at least the distribution of body weight of the user or the distribution of body heat of the user; and causing a speaker of the soundbar to emit an audio comprising one or more of music, an alert, information relating to the health index, or instructions to the user.

In some implementations, the method can further comprise: generating one or more instructions to a scale to cause the scale to rotate as the user stands on the scale; and causing the sensor to obtain the sensor data as the scale rotates.

Non-transitory computer-readable media including computer-executable instructions that, when executed by a computing system, can cause the computing system to perform operations comprising: accessing sensor data originating from a sensor of a soundbar, the sensor comprising one or more cameras configured to capture electromagnetic radiation including infrared radiation and visible light radiation, the sensor data comprising image data of the user and relating to a physiology of the user; determining a distribution of body heat of the user based on at least the image data of the user, the image data comprising infrared image data indicating thermal energy; determining a distribution of body weight of the user based on at least the image data of the user, the image data comprising visible light image data; determining a health index of the user from at least the distribution of body weight of the user or the distribution of body heat of the user; and causing a speaker of the soundbar to emit an audio comprising one or more of music, an alert, information relating to the health index, or instructions to the user.

In some implementations, the computer-executable instructions, when executed by the computing system, further cause the computing system to perform operations comprising: generating one or more instructions to a scale to cause the scale to rotate as the user stands on the scale; and causing the sensor to obtain the sensor data as the scale rotates.

The present disclosure provides a soundbar for performing physiological measurements. The soundbar may comprise a speaker, a sensor, a memory, and a hardware processor. The speaker can be configured to emit audio signals. The sensor can be configured to obtain sensor data relating to a physiology of a user. The sensor can include a camera. The sensor data can include one or more images. The memory can be configured to store the sensor data. The hardware processor can be configured to access the sensor data. The hardware processor can be configured to determine a distribution of body weight of the user based on at least the one or more images. The hardware processor can be configured to determine a health index of the user based on at least the distribution of body weight of the user.

In some implementations, the sensor includes a 3D camera.

In some implementations, the sensor includes an infrared camera configured to capture radiation in the infrared portion of the electromagnetic spectrum.

In some implementations, the hardware processor is further configured to determine a distribution of heat of the user's body based on at least the sensor data obtained from the infrared camera.

In some implementations, the hardware processor is further configured to compare multiple images of the user.

In some implementations, the multiple images include one or more historical images and one or more current images.

In some implementations, the hardware processor is further configured to perform image processing and/or pattern recognition on images obtained by the sensor.

In some implementations, the hardware processor is further configured to determine an orientation of the user based on at least the image processing and/or pattern recognition of the images.

In some implementations, the hardware processor is further configured to generate instructions to the user for the user to change orientation, wherein the instructions are based on at least the determined orientation.

In some implementations, the soundbar is further in communication with a scale configured to determine a weight of the user.

In some implementations, the hardware processor is further configured to generate instructions to cause the scale to rotate.

In some implementations, the sensor includes a light detection and ranging (LIDAR) sensor.

In some implementations, the hardware processor is further configured to determine one or more dimensions of one or more portions of the user's body based on at least the sensor data.

In some implementations, the hardware processor is further configured to generate user interface data for rendering a display; and communicate the user interface data to a computing device to be displayed.

The present disclosure provides a soundbar for medical monitoring. The soundbar may comprise a speaker, a sensor, and a hardware processor. The speaker can be configured to emit audio signals. The sensor can be configured to obtain sensor data relating to a physiology of a subject. The sensor can include a camera. The sensor data can include one or more images. The hardware processor can be configured to access the sensor data. The hardware processor can be configured to determine an orientation of the subject based on at least the one or more images. The hardware processor can be configured to determine an amount of time the subject has been oriented in the determined orientation. The hardware processor can be configured to generate an alarm based on at least the determined orientation and/or the determine amount of time.

In some implementations, the subject is an infant.

In some implementations, the subject is a hospital patient.

In some implementations, the determined orientation includes one or more of an upright orientation, a supine orientation, a prone orientation, a side orientation, or a fall orientation.

In some implementations, the hardware processor is further configured to generate the alarm in response to determining that the determined amount of time exceeds a threshold.

The present disclosure provides a soundbar for medical monitoring. The soundbar may comprise a speaker, a sensor, and a hardware processor. The speaker can be configured to emit audio signals. The sensor can be configured to obtain sensor data relating to a physiology of a subject. The sensor can include an infrared sensor. The sensor data can include infrared energy data indicating thermal energy. The hardware processor can be configured to access the sensor data. The hardware processor can be configured to determine a distribution of body heat of the subject based on at least the infrared energy data. The hardware processor can be configured to generate an alarm based on at least the distribution of body heat.

In some implementations, the subject is a baby.

In some implementations, the subject is a hospital patient.

The present disclosure provides a soundbar for medical monitoring. The soundbar may comprise a speaker, a sensor, and a hardware processor. The speaker can be configured to emit audio signals. The sensor can be configured to obtain sensor data relating to a physiology of a subject. The sensor can include a camera. The sensor data can include one or more images. The hardware processor can be configured to generate instructions for a user to perform a health-related activity. The hardware processor can be configured to access the sensor data including sensor data obtained while the user performs the health-related activity. The hardware processor can be configured to determine a health status of the user based on at least the sensor data obtained while the user performs the health-related activity.

In some implementations, the instructions include one or more audio signals emitted from the speaker and/or user interface data rendered on a displayed in communication with the soundbar.

The present disclosure provides a soundbar for medical monitoring. The soundbar may comprise a speaker, a sensor, and a hardware processor. The speaker can be configured to emit audio signals. The sensor can be configured to obtain sensor data relating to a physiology of a subject. The sensor can include a camera. The sensor data can include one or more images. The hardware processor can be configured to access the one or more images including at least images of the user's face. The hardware processor can be configured to analyze one or more facial features of the user based on at least the images of the user's face. The hardware processor can be configured to determine a health status of the user based on at least the images of the user's face.

In some implementations, the health status includes a stroke.

The present disclosure provides a soundbar for medical monitoring. The soundbar may comprise a speaker, a sensor, and a hardware processor. The speaker can be configured to emit audio signals. The sensor can be configured to obtain sensor data relating to a physiology of a subject. The sensor can include a camera. The sensor data can include one or more images. The hardware processor can be configured to access the sensor data. The hardware processor can be configured to access statistical information including physiological data relating to a group of people. The hardware processor can be configured to determine a health status of the user based on at least the sensor data and the statistical information.

The present disclosure provides a soundbar for medical monitoring. The soundbar may comprise a speaker, a sensor, and a hardware processor. The speaker can be configured to emit audio signals. The sensor can be configured to obtain sensor data relating to a physiology of a subject. The sensor can include a camera. The sensor data can include one or more images of a user while ambulating. The hardware processor can be configured to access the sensor data. The hardware processor can be configured to determine an ambulatory condition of the user based on at least the one or more images of a user while ambulating.

The present disclosure provides a soundbar for medical monitoring. The soundbar may comprise a speaker, a sensor, and a hardware processor. The speaker can be configured to emit audio signals. The sensor can be configured to obtain sensor data relating to a physiology of a subject. The sensor can include a camera. The sensor data can include one or more images of a user. The hardware processor can be configured to access the sensor data. The hardware processor can be configured to determine a skin condition of the user based on at least one or more images of the user.

The present disclosure provides a soundbar for medical monitoring. The soundbar may comprise a speaker, a sensor, and a hardware processor. The speaker can be configured to emit audio signals. The sensor can be configured to obtain sensor data of a location. The sensor can include a camera. The sensor data can include one or more images. The hardware processor can be configured to access the sensor data. The hardware processor can be configured to detect a subject in the one or more images. The hardware processor can be configured to determine whether the subject is authorized to be in the location.

In some implementations, the subject is a health care provider.

In some implementations, the location is a hospital room.

In some implementations, the location is a home.

The present disclosure provides a soundbar for medical monitoring. The soundbar may comprise a speaker, a sensor, and a hardware processor. The speaker can be configured to emit audio signals. The sensor can be configured to obtain sensor data relating to a physiology of a subject. The sensor can include a camera. The sensor data can include one or more images. The hardware processor can be configured to receive audio related data from a computing device remote to the soundbar. The hardware processor can be configured to modify an audio playback signal based on at least the audio related data. The hardware processor can be configured to transmit the modified audio playback signal to the speaker to be emitted by the soundbar.

In some implementations, the computing device is an earbud, headphone, and/or earphone.

In some implementations, the audio related data includes frequency dependent gains.

In some implementations, the audio related data includes a hearing transfer function.

In some implementations, the audio related data includes adjustments to one or more of a latency or phase.

Various combinations of the above and below recited features, embodiments, implementations, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise a computer-readable storage medium having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising a computer-readable storage medium are disclosed, wherein the computer-readable storage medium has program instructions embodied therewith, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

Various embodiments will be described hereinafter with reference to the accompanying drawings. These embodiments are illustrated and described by example only, and are not intended to limit the scope of the disclosure. In the drawings, similar elements may have similar reference numerals.

DETAILED DESCRIPTION

The present disclosure will now be described with reference to the accompanying figures, wherein like numerals refer to like elements throughout. The following description is merely illustrative in nature and is in no way intended to limit the disclosure, its application, or uses. It should be understood that steps within a method may be executed in different order without altering the principles of the present disclosure. Furthermore, the devices, systems, and/or methods disclosed herein can include several novel features, no single one of which is solely responsible for its desirable attributes or which is essential to practicing the devices, systems, and/or methods disclosed herein.

Figure 1:
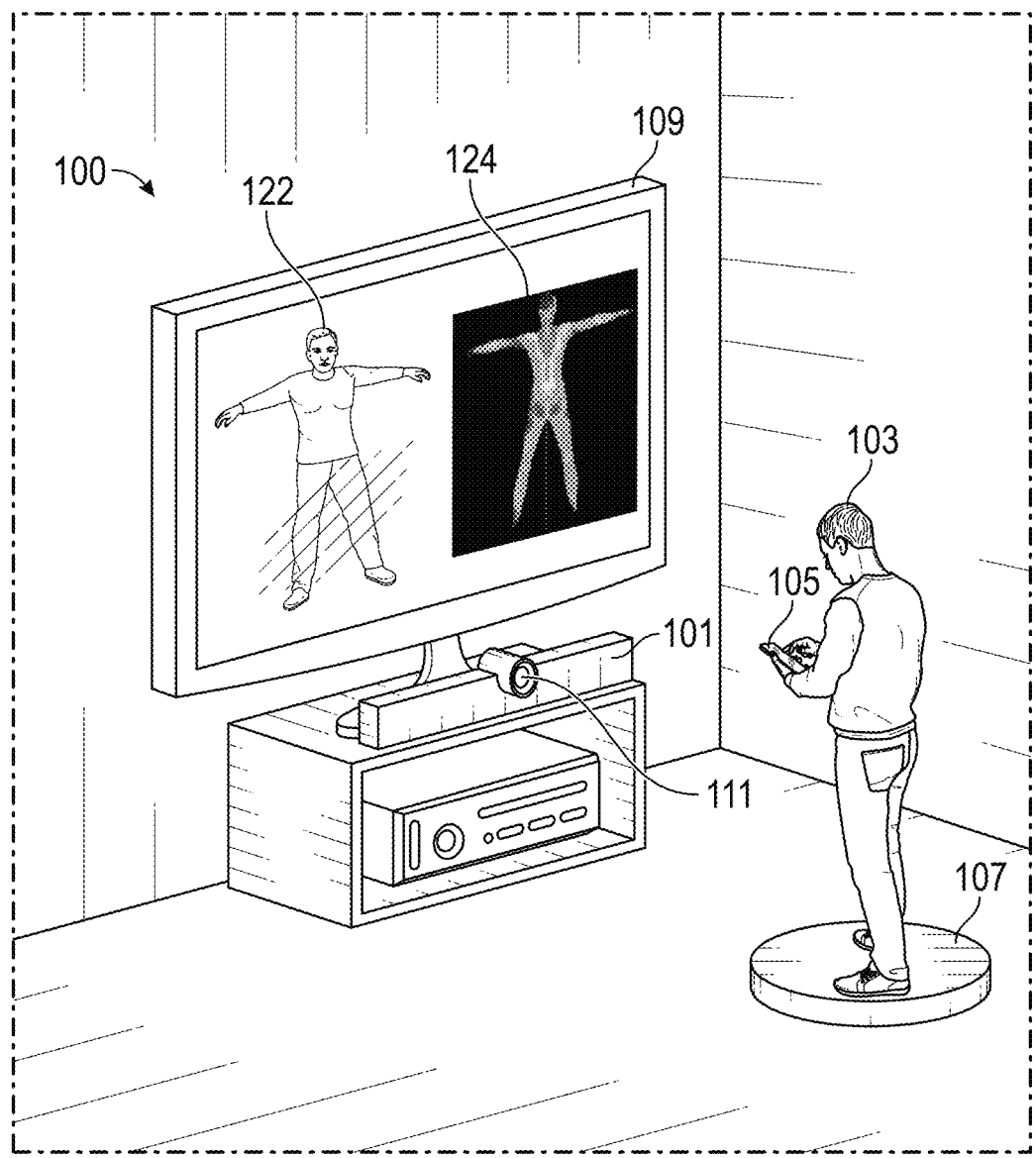
FIG. 1 illustrates an example system for monitoring a user's physiological information.

FIG. 1 illustrates an example implementation of a system 100 for monitoring physiological information of a user 103. The system 100 can include a soundbar 101. In some implementations, the system 100 may optionally include one or more of a display 109, a mobile device 105, and a scale 107. Various components or devices of the system 100 may be in communication, such as wireless communication.

The soundbar 101 can be perform one or more measurements relating to a physiology of the user 103. The soundbar 101 can monitor a user 103. The user may be a baby or a patient in a hospital or a user in a home. The soundbar 101 can include one or more sensor(s) 111. The sensor(s) 111 can include one or more image sensors. The sensor(s) 111 can include one or more cameras. The one or more cameras may include CCD cameras and/or CMOS cameras. The sensor(s) 111 can include one or more types of cameras. The sensor(s) 111 can include a camera configured to capture optical radiation in the visible portion of the electromagnetic spectrum. The sensor(s) 111 can include a camera or sensor configured to capture optical radiation in the infrared portion of the electromagnetic spectrum. The sensor(s) 111 can include a 3D camera. The sensor(s) 111 can include a high-resolution camera. The sensor(s) 111 can include a plurality of cameras. The sensor(s) 111 can include a stereovision camera. The sensor(s) 111 can include a depth camera. The sensor(s) 111 can include a light detection and ranging (LIDAR) sensor. The sensor(s) 111 can include a millimeter wave (mmWave) sensor. The sensor(s) 111 can include an ultrawide band sensor. The sensor(s) 111 can be integrated into the soundbar 101. The sensor(s) 111 may be disposed within a housing of the soundbar 101. The sensor(s) 111 and the soundbar 101 can form a single integrated unit. The soundbar 101 can include one or more speakers configured to emit audio, such as music, voice audio, etc.

The soundbar 101, such as sensor(s) 111 thereof, can be configured to capture images of the user 103 to generate image data of the user 103. The soundbar 101, such as one or more hardware processors of the soundbar 101, can process the image data. The soundbar 101 can determine a health or wellness index of the user 103 based on at least the image data. The health index may indicate one or more physiological parameters of the user. The health index can indicate a body mass index (BMI) of the user 103 based on at least the information obtained from the sensor(s) 111. The health index can indicate a thermal distribution of the user 103. The health index can indicate a likelihood the user 103 is infected with a pathogen, such as a bacteria or virus. The soundbar 101 can determine how a weight of the user 103 is distributed on the user 103. The soundbar 101 can determine dimensions of the user's 103 body. The soundbar 101 can determine how heat is distributed on the user's 103 body.

The soundbar 101 may be in communication with a display 109. The soundbar 101 may generate user interface data and may communicate the user interface data to the display 109. The display 109 may render one or more user interfaces based on at least user interface data received from the soundbar 101. The user interfaces can include indica of a health index determined by the soundbar 101. The user interfaces can include physiological data of the user 103, such as physiological parameters. The user interfaces can include information received from one or more remote devices, such as the scale 107 or mobile device 105. The user interfaces can include images corresponding to image data generated by a camera of the soundbar 101. The images can correspond to the user 103. The images can include real-time images of the user 103. For example, the display 109 may render one or more user interfaces including images of the user 103 as the sensor(s) 111 generate the image data. The images can include historical images, such as images of the user 103 corresponding to image data previously generated by the sensor(s) 111. The display 109 displays image 122 of the user 103. The image 122 can be a historical and/or real-time image of the user 103. For example, the image 122 may be an image that was captured by a camera sensor 111 of the soundbar in real-time as the user 103 stands in front of the soundbar 101 and looks at the display 109. As another example, the image 122 may be an image that was previously captured by a camera sensor 111 of the soundbar such as one week prior, one month prior, one year prior, etc. The user 103 may view such a historical image to view differences between the user's 103 body then and now. The image 122 may be superimposed with dimensions such as captured by sensor(s) 111 such as a LIDAR sensor. LIDAR may image objects using one or more of ultraviolet, visible light, or near infrared.

The user interface can include thermal images. The image 124 can correspond to image data generated by an infrared sensor or camera of the soundbar 101. The image 124 can include information relating to a body heat of the user 103. For example, the image 124 can be a thermal image of the user 103 with various shading or coloring indicating various temperatures. The image 124 can be a historical and/or real-time image of the user 103.

The user 103 may be able to control the display 109. For example, the user 103 can control the images that are displayed and how they are displayed. For example, the user 103 can add and/or remove filters, such as infrared filters, to the image 124 to provide various effects.

In some implementations, the images 122 and/or 124 may be an image captured by a camera and may accurately portray the user 103 in great detail. In some implementations, the images 122 and/or 124 may be a representation of the user 103 which may omit or alter visual details of the user to provide security or privacy. For example, the images 122 and/or 124 may include an avatar representation of the user 103, such as a stick figure, a cartoon, an animation, or the like. The sensor(s) 111 can include a privacy shutter. The privacy shutter can prevent the sensor(s) 111 from generating data relating to the user 103. The user 103 may actuate the privacy shutter. In some implementations, the soundbar 101 may automatically implement the privacy shutter. The privacy shutter can, for example, cover a lens of a camera.

The user interfaces rendered by the display 109 can also include instructions to the user 103. The instructions can relate to performing a physiological measurement. For example, the display 109 may display instructions to the user 103 to orient themselves in a certain direction for optimal detection by the sensor(s) 111, or to stand still, or to rotate in a circle, or the like. The instructions can include text. The instructions can include one or more images, visual indicators, avatars, or the like. The soundbar 101 may generate the instructions based on real-time data generated by the sensor(s) 111. In some implementations, the soundbar 101 may emit audio indicating instructions to the user 103.

The user interfaces rendered by the display 109 may include information or images that may not be related to the physiology of the user 103 and/or that may not be received from the soundbar 111. For example, the display 109 may display information received via satellite, broadcast, a network, internet, and such information can include broadcast media. In some implementations, the display 109 may display information received from the soundbar 111 (e.g., physiological data relating to the user 103) in one portion and may display information received from other sources in another portion. In some implementations, the display 109 may overlay or superimpose the information received from the soundbar 111 onto images received from other sources. For example, the user 103 may watch a television broadcast on the display 109 and may simultaneously view their health information on the display 109.

In some implementations, the display 109 may display one or more instructions or requests to the user 103. For example, the display 109 may display one or more exercises for the user 103 to perform. The user 103 may follow along with visual cues provided on the display 109 of how to perform the exercise or what tasks to perform. The soundbar 101 may monitor the user 103 as they perform the exercise and may determine a health status or physiological condition of the user 103 such as based on processing image data of the user obtained by the sensor(s) 111 while performing the exercise.

The soundbar 101 may be in communication with mobile device 105. The mobile device 105 can include a smartphone. The mobile device 105 can receive information from the soundbar 109 such as user interface data, images obtained from a camera of the soundbar 101, and/or physiological data of the user 103. The mobile device 105 may be configured to render user interfaces via a display which may be similar to user interfaces shown and/or described with reference to display 109. The mobile device 105 may communicate information to the soundbar 101. The mobile device 105 can communicate instructions to the soundbar 101 such as to control operation of the soundbar 101. For example, the user 103 may control operation of the soundbar 101 via the mobile device 105. For example, the user can control the speakers of the soundbar 101, the sensor(s) 111 of the soundbar 101, and/or measurements or monitoring operations performed by the soundbar 101. The mobile device 105 can communicate physiological information to the soundbar 101, such as physiological data generated by the mobile device 105 and/or one or more wearable devices associated with the mobile device 105.

The soundbar 101 may be in communication with the scale 107. The scale may be configured to measure a weight of the user 103. The scale 107 may be configured to determine other physiological information of the user such as BMI, lean muscle mass, percent body fat, percent water weight of the user, changes in physiological information, etc. The scale 107 can include one or more electrodes. A user may contact the electrodes as the user 103 stands on the scale 107 (e.g., with their bare feet). The scale 107 can generate ECG data indicating a cardiac condition of the user 103. The scale 107 can communicate physiological information to the soundbar 101, such as physiological information generated and/or determined by the scale 107 (e.g., weight, BMI, etc.). In some implementations, the soundbar 101 may further refine physiological information received from the scale 107, such as by using sensor data generated by the sensor(s) 111. For example, the soundbar 101 may further refine a BMI received from the scale based on at least a height of the user 103 and/or a weight distribution of the user 103 determined based on image data generated by the sensor(s) 111.

The scale 107 can be configured to rotate. In some implementations, the scale 107 may rotate in response to a motor of the scale 107 generating a force to cause the scale 107 to rotate. In some implementations, the scale 107 may rotate freely such as in response to an external force applied to the scale 107. The scale 107 can receive information from the soundbar 101. The information can include instructions. For example, the soundbar 101 may communicate instructions to the scale 107 to cause the scale to rotate as the user stands on the scale such that the sensor(s) 111 may perform sensing of a plurality of portions of the body of the user 103.

In some implementations, the scale 107 may rotate automatically. For example, the scale 107 may rotate independent of any instructions received from the soundbar 101. As another example, the scale 107 may rotate in response to a user 103 standing on the scale 107. In some implementations, the scale 107 may communicate information to the soundbar 101 to control one or more operations of the soundbar 101. For example, the scale 107 may communicate instructions to cause the soundbar 101 (and/or sensors 111) to activate, to turn on, to begin generating sensor data, etc. In some implementations, the scale 107 may communicate instructions to the soundbar 101 to cause the sensor(s) 111 to generate sensor data (e.g., collecting images) in response to a user 103 standing on the scale 107. In some implementations, the soundbar 101 may perform measurement operations of the user 103 without the scale. For example, the user 103 may stand in front of the soundbar 101 (without the scale 107) as the sensor(s) 111 sense the user 103. The user 103 can rotate in front of the soundbar 101 (with or without the scale 107).

Figure 2:
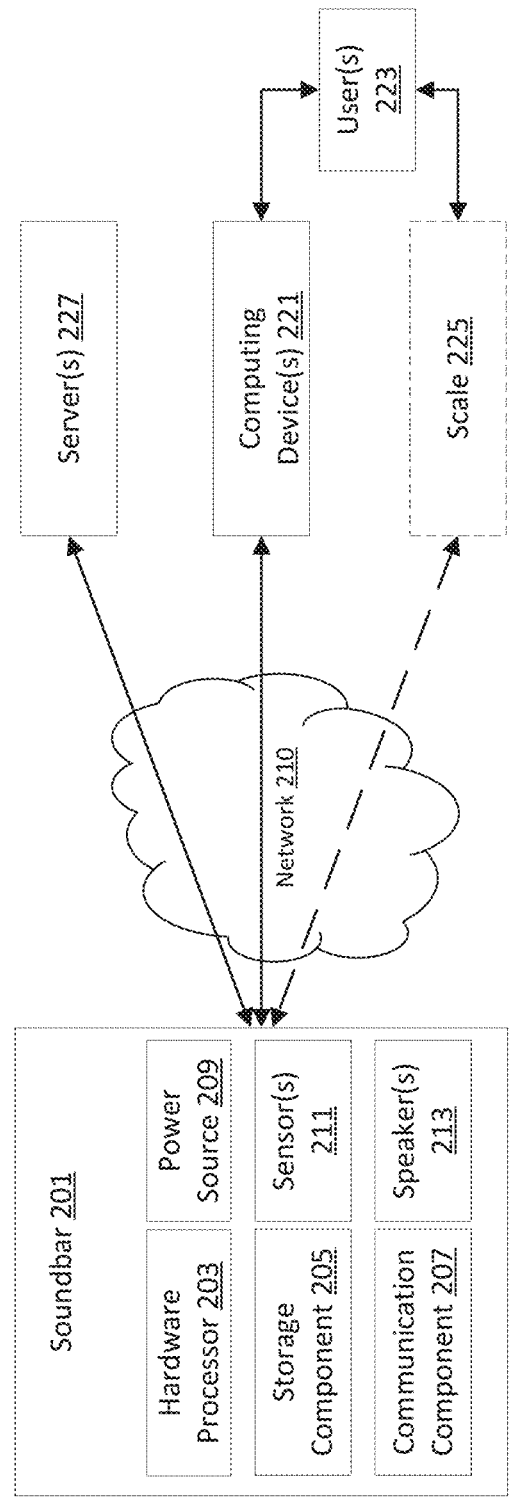
FIG. 2 is a schematic block diagram illustrating an example implementation of a soundbar.

FIG. 2 is a schematic block diagram illustrating an example implementation of a soundbar 201. The soundbar 201 can include a hardware processor 203, a storage component 205, a communication component 207, a power source 209, one or more sensors 211, and/or one or more speakers 213. The hardware processor 203 can include one or more processors configured to execute program instructions to cause the soundbar 201, or components thereof, or other systems or devices, to perform operations. The processor 203 can be configured, among other things, to process data, execute instructions to perform one or more functions, and/or control the operation of the soundbar 201. For example, the processor 203 can process data such as image data obtained from the sensor(s) 211 and can execute instructions to perform functions related to processing, storing, and/or transmitting such data.

The processor 203 can calculate physiological information of a user, such as physiological parameters. The processor 203 can calculate physiological information based on at least data obtained from the sensor(s) 211. For example, the processor 203 can calculate a body mass index (BMI) of a user 223 based on image data obtained from an image sensor such as a camera and/or information from a LIDAR sensor. The processor 203 can determine a weight distribution of the user 223 such as where on the user's body their weight is distributed. A weight distribution determination may improve physiological determinations such as BMI determination. For example, the processor 203 may determine, based on image data, that high percentage of the user's weight is distributed around the torso or mid-section of the user which may indicate an unhealthy BMI. As another example, the processor 203 may determine that a user has their weight distributed in the legs, chest, and arms, which may indicate a healthy BMI. The processor 203 may determine physiological information of a user based on at least real-time and/or historical physiological information of the user. In some implementations, the processor 203 may determine physiological information of the user based on at least statistical information such as physiological information relating to a plurality of other people. For example, the processor 203 may determine physiological information of the user based on comparing image data or other data of the user with historical information of the user and/or with statistical information. The processor 203 may determine physiological information of a user based on at least data obtained from the scale 207. The processor 203 may determine a health index of the user based on at least one or more of weight distribution of a user, such as determined by processing sensor data, heat distribution of a user, such as determined by processing sensor data, and/or scale data received from the scale 207.

The processor 203 may measure a user's body or body parts. For example, the processor 203 can determine the user's height. As another example, the processor 203 may determine dimensions of certain body parts of the user. For example, the processor 203 may determine the circumference of a user's stomach, chest, thighs, arms, or the like. The processor 203 can determine a length of a user's arms or legs or torso. The processor 203 can determine ratios of various portions of the user's body. The processor 203 can determine an alignment of various portions of the user's body. The processor 203 can determine a symmetry of various portions of the user's body. The processor 203 can determine the user's dimensions based on at least information obtained from the sensor(s) 211 such as a camera and/or LIDAR sensor. As an example, as a user rotates in front of the soundbar 201, the sensor(s) 211 may determine distances to determine the user's body measurements. The processor 203 may use the user's body dimensions to further improve physiological determinations such as determining a health index, BMI, or the like.

The processor 203 can determine a heat distribution of the user 223. The processor 203 can determine a heat distribution based at least on information obtained from the sensors(s) 211 which can include an IR camera. The heat distribution may improve physiological determinations. For example, the processor 203 may analyze the user's circulation or blood flow based on the user's heat distribution. For example, low thermal energy at the user's peripheries such as arms and legs may indicate poor blood flow. The processor 203 can determine a temperature of a user, such as based on information obtained from the sensor(s) 211, such as an infrared sensor. The temperature may be a core body temperature. The temperature may be a surface body temperature. The processor 203 may be configured to determine one or more physiological states of the user based on at least the user's temperature, such as whether the user has a fever, is infected with a pathogen, is hypothermic, etc.

The processor 203 can determine one or more physiological states of the user, such as weight distribution or heat distribution, based on at least processing sensor data, such as image data. The processor 203 may implement one or more image processing techniques to analyze image data obtained from the sensor(s) 211. The processor 203 may implement one or more pattern recognition techniques to analyze image data obtained from the sensor(s) 211. The processor 203 can compare one or more images obtained from sensor(s) 211. For example, the processor 203 may compare a current image of the user 223 with a historical image of the user 223. Using the multiple images, the processor 203 may perform image processing to determine health trends of the user 223 such as whether the user 223 is changing weight, how the distribution of weight on the user 223 has changed over time, how thermal distribution (which may indicate perfusion) of the user 223 has changed over time, or the like.

The processor 203 can perform photoplethysmography (PPG) with sensor data originating from the sensor(s) 211. The processor 203 can perform remote photoplethysmography (PPG). The sensor data can include optical data which may comprise image data. The sensor(s) 211 may detect ambient light reflected from the skin of a user and in response generate sensor data from the captured reflected light. The processor 203 can process the sensor data to generate PPG data. PPG data can relate to volumetric changes, such as volumetric changes of blood vessels resulting from cardiac activity and/or volumetric changes of a thoracic cavity resulting from breathing. The processor 203 can implement one or more PPG techniques (which can include remote PPG techniques) to analyze the sensor data to determine one or more physiological parameters of the user. Sensor data may comprise one or more pixels. Pixels may correspond to red, blue, or green wavelengths. The processor 203 may analyze pixel color and/or variation to determine physiological parameters. The processor 203 can determine one or more of pulse rate, blood pressure, respiration rate, respiration volume, cardiac output, perfusion index, pleth variability, blood oxygen saturation (SpO2), and/or a PPG waveform. Accordingly, the present disclosure provides for a contactless method to determine a user's physiological parameters. The processor 203 can determine a user's physiological parameters without a device, such as a sensor, contacting the user. In some implementations, the processor 203 can implement one or more image processing techniques to identify a portion of an image for processing for analyzing PPG data such as to generate physiological parameters. In one example implementation, the processor 203 can identify a portion of image corresponding to specific body part of a user for analyzing PPG data. The body part may be referred to as a region of interest. The body part may be a body part containing a high density of blood vessels near a surface of the skin. The body part can be a face of a user, a forehead of a user, arms of a user, hands of a user, feet of a user, a throat of a user, a neck of a user, etc. The processor 203 may analyze sensor data corresponding to multiple regions of a user's body, such as a user's face and a user's hands. Analyzing sensor data corresponding to multiple regions of a user's body may improve the accuracy of determining physiological parameters of the user.

The processor 203 can perform image processing on images obtained from a camera such as sensor(s) 211. The processor 203 can perform pattern recognition of images. As an example, the processor 203 can determine an orientation of a user based on images received from the sensor(s) 211. For example, based on images obtained from the sensor(s) 211, the processor 203 can determine which direction a user is facing, such as towards the soundbar 201, away from the soundbar 201, etc. Based on the user's determined orientation, the processor 203 can generate instructions to cause the user to change their orientation so that the soundbar 201 may perform an accurate measurement of the user. For example, the soundbar 201 may cause the scale 225 to rotate and/or may cause display and/or audio instructing the user to rotate. As another example of image processing to determine subject orientation, the processor 203 may be configured to determine an orientation of a subject laying in a bed such as a patient in a hospital bed or sleeping baby. Orientations can include an upright orientation, a supine orientation, a prone orientation, a side orientation, or a fall orientation. For example, the processor 203 may perform image processing and/or pattern recognition on images obtained by the sensor(s) 211 to determine whether a subject is laying on their side, on their stomach, on their back, whether a subject is standing up, whether a subject has fallen down, such as off of a bed, or the like. The processor 203 may be determine an amount of time a subject has been oriented in a certain orientation. The processor 203 can generate one or more alarms depending on a subject's determined orientation and/or amount of time in a certain orientation. For example, the processor 203 can generate an alarm if a patient has been oriented in a certain position in excess of a time threshold which could result in bed sores or pressure ulcers. As another example, the processor 203 can generate an alarm if a sleeping baby has fallen out of a bed or has not moved from a certain position for longer than a threshold amount of time. The alarm can be one or more audio signals such as played through the speaker(s) 213 and/or computing device 221, and/or visual signals displayed on a device such as computing device 221.

The processor 203 can determine physiological information relating to a thermal energy of a subject such as the body heat of a patient or sleeping baby based on information obtained from an infrared (IR) sensor or camera. The processor 203 can generate one or more alarms based on information received from an IR camera. For example, the processor 203 may determine that a body temperature of a sleeping baby is unusually high or low based on the information from the IR camera and may generate an alarm.

The processor 203 may generate user interface data for rendering user interface displays. The user interface displays can include physiological information of a user and/or instructions to a user to perform physiological measurement. The user interface displays can include images of the user captured by the sensor(s) 211 such as real-time images and/or historical images. The processor 203 can generate instructions to control the operation of one or more remote devices such as scale 225. The processor 203 can perform facial recognition such as based on images obtained from the sensor(s) 211.

The processor 203 may determine whether one or more care provides are present such as a health care provider in a hospital or a care provider in a home such as based on facial recognition. The processor 203 may be configured to determine whether one or more unauthorized persons are present such as in a hospital room or a home, such as an intruder, such as based on facial recognition.

The processor 203 may determine one or more voice commands such as from a user and detected by a microphone which may control one or more operations of the soundbar. The processor 203 may be configured to detect screaming, crying, or the like. For example, the processor 203 may determine that a baby is crying.

The processor 203 may be configured to determine a user's gait or ambulatory condition. For example, the processor 203 may determine that a user is walking abnormally such as with a limp, or unevenly which may indicate joint problems, bone length irregularities, muscle irregularities or weakness, neurological issues, or the like.

The processor 203 may be configured to determine one or more physiological parameters of a user, such as pulse rate, blood oxygen content (SpO2), respiration rate, or the like, which may be based at least in part on information obtained from the sensor(s) 211 such as information from a camera. The processor 203 may detect breathing patterns. The processor 203 may determine whether a user is breathing abnormally such as hyperventilating, or experiencing breathing apnea, or not breathing, etc.

The processor 203 may be configured to determine a skin color, tone, or shade of a user based on information obtained from a sensor 211 such as a camera. For example, the processor 203 may determine that a user has been sunburned, may detect one or more skin irregularities, such as sunspots, tan lines, skin cancer, lesions, or the like. The processor 203 may detect a trend in the skin color of the user. In some implementations, skin color may indicate perfusion or respiration. For example, the processor 203 may determine whether a baby is breathing properly based on a skin color of the baby.

The processor 203 may be configured to monitor a user's sleep cycles such as based on a user's movement as detected by a camera or motion sensor.

The processor 203 may be configured to monitor and/or detect a user's eye activity. For example, the processor 203 may detect a user's eye movement patterns such as by implementing eye tracking of a camera. The processor 203 may detect pupillometry of a user such as a user's pupil dilation in response to light stimulus.

The processor 203 may be configured to determine whether an infant has been moved. The processor 203 may determine whether an unauthorized person has moved the infant. The processor 203 may determine whether the infant is in an unauthorized location. The processor 203 may determine one or more positions, orientations, movements of an infant such as when sleeping or when awake. The processor 203 may determine whether an infant is crying, an amplitude or volume of the cry, a duration of the cry, or the like. The processor 203 may determine a level of distress of the infant based on one or more of the infant's cry, position, orientation, etc.

The processor 203 may be configured to detect and/or analyze one or more facial features and/or expressions of a user. The processor 203 may analyze facial features to determine facial recognition, stroke detection, or the like. For example, the processor 203 may determine a user has experienced a stroke based on a user's smile or other facial muscles acting irregularly.

The processor 203 may be configured to detect and/or analyze a speech of a user. The processor 203 may analyze a user's speech to recognize voice commands to control operation of the soundbar 201, to detect a stroke of the user or the like. For example, the processor 203 may determine irregularities in the user's speech which may indicate the user has experienced a stroke. The processor 203 may analyze a user's speech, such as vocabulary, over time which may indicate cognitive abilities of the user. For example, the processor 203 may track an infant's increasing vocabulary over time or may track an elderly person's decreasing vocabulary usage over time which may indicate Alzheimer's, dementia, or other cognitive decline.

The processor 203 may be configured to detect and/or analyze a user's movements such as movements relating to fine motor movements. For example, the processor 203 may analyze a user's hand movements to detect shaking, tremors, etc. which may indicate a health status of a user such as Parkinson's, or other neuromuscular condition.

The processor 203 may be configured to implement one or more tests or health checks to be taken by a user. For example, the soundbar 201 may issue one or more request (e.g., audio or visual) for a user to do one or more tasks or exercises in front of the soundbar 201. The soundbar 201 may monitor the user as they perform the exercises such as with a camera. For example, the soundbar 201 may request the user to reach as high as they can, to walk on their toes, to bend over, to touch a certain portion of a display screen in communication with the soundbar 201, or the like. Based on the user performing the one or more tasks or exercises, the processor 203 may determine one or more health conditions of the user such as a hand-eye coordination, a flexibility, a muscle tone, or the like. As another example, the soundbar 201 may request the user to smile, or frown, or move their eyes in a certain direction. The processor 203 may determine a cognitive state of the user such as a dementia, stroke, Alzheimer's, Parkinson's, or the like. As another example, the soundbar 201 may request the user to perform one or more cognitive tasks such as simple puzzle, or memory exercise, or other task which may indicate user's cognition. The processor 203 may track the user's cognition over time.

The processor 203 may be configured to perform a hearing test of user. For example, the soundbar 201 may request the user to respond according to one or more sounds emitted by the soundbar 201 to determine a hearing capability of the user.

The processor 203 may be configured to perform an eye test of the user. For example, the soundbar 201 may request the user to respond according to one or more images displayed by a display in communication with the soundbar. For example, the soundbar 201 may request the user to identify letters or numbers of various sizes displayed on the display to determine the user's eyesight. As another example, the soundbar 201 may request the user to identify various objects of certain colors displayed on the display to determine a user's color detection which may indicate color blindness.

The processor 203 may be configured to determine whether a user has taken medication. For example, the processor 203 may analyze image data to determine whether one or more cupboards or drawers containing medicine was opened at a certain time. As another example, the processor 203 may recognize certain pills taken by the user based on image data as the user consumes the pills. The processor 203 may generate reminders for a user to take medication at the appropriate time.

The storage component 205 can include one or more memory devices that store data, including without limitation, dynamic and/or static random-access memory (RAM), programmable read-only memory (PROM), erasable programmable read-only memory (EPROM), electrically erasable programmable read-only memory (EEPROM), and the like. The storage component 205 can be configured to store data such as data obtained from the sensor(s) 211, such as camera images, processed and/or unprocessed physiological data, such as body mass index (BMI), or the like.

The communication component 207 can facilitate communication (via wired and/or wireless connection) between the soundbar 201 (and/or components thereof) and separate devices, such as separate monitoring, display, and/or mobile devices. For example, the communication component 207 can be configured to allow the soundbar 201 to communicate with other devices, systems, and/or networks over any of a variety of communication protocols. The communication component 207 can be configured to use any of a variety of wired communication configurations such as HDMI, USB, ethernet, coaxial, fiber optics, twisted pair, or the like. The communication component 207 can be configured to use any of a variety of wireless communication protocols, such as Wi-Fi (802.11x), Bluetooth®, ZigBee®, Z-wave®, cellular telephony, infrared, near-field communications (NFC), RFID, satellite transmission, proprietary protocols, combinations of the same, and the like. The communication component 207 can allow data and/or instructions to be transmitted and/or received to and/or from the soundbar 201 and separate computing devices. The communication component 207 can be configured to transmit and/or receive (for example, wirelessly) processed and/or unprocessed data such as physiological data, sensor data, image data, user interface data, or other information to separate computing devices, which can include, among others, a mobile device (for example, an iOS or Android enabled smartphone, tablet, laptop), a desktop computer, a wearable device such as a smartwatch, a server or other computing or processing device for display and/or further processing, among other things. Such separate computing devices can be configured to store and/or further process the received data and/or other information, to display information indicative of or derived from the received information. As another example, the communication component 207 of the soundbar 201 can be configured to wirelessly transmit processed and/or unprocessed data such as sensor data and/or other information to a mobile phone which can include one or more hardware processors configured to execute an application that generates a graphical user interface displaying information representative of the data or other information obtained from the soundbar 201. The communication component 207 can be embodied in one or more components that are in communication with each other. The communication component 207 can comprise a wireless transceiver, an antenna, and/or a near field communication (NFC) component.

The soundbar 201 can include a power source 209. The power source 209 can provide power for hardware components of the soundbar 201 described herein. The power source 209 can be, for example, a lithium battery. Additionally or alternatively, the soundbar 201 can be configured to obtain power from a power source that is external to the soundbar 201. For example, the soundbar 201 can include or can be configured to connect to a cable which can itself connect to an external power source to provide power to the soundbar 201.

The soundbar 201 can include one or more sensors 211. The sensor(s) 211 can include one or more types of sensors. The sensor(s) 211 may be sensitive and/or responsive to electromagnetic radiation. The sensor(s) 211 can generate image data responsive to electromagnetic radiation. The sensor(s) 211 can generate one or more voltages responsive to electromagnetic radiation. The sensor(s) 211 can include one or more light-sensitive sensors. The sensor(s) 211 can include one or more optical sensors. The sensor(s) 211 can include one or more photodiodes. The sensor(s) 211 can include one or more image sensors. The sensor(s) 211 can include one or more cameras. The camera can include a CCD camera and/or a CMOS camera. The camera can include a 3D camera, a depth camera, or a stereovision camera. The camera can include multiple lenses. The camera can include a stereo camera. The camera can include one or more lenses that shift viewpoints. The processor 203 can cause the one or more cameras to adjust a view of the one or more cameras. Adjusting the view of the one or more cameras can comprise one or more of rotating the one or more cameras, adjusting a zoom of the one or more cameras, pivoting the one or more cameras, tilting the one or more cameras, or panning the one or more cameras. The camera can be configured to capture images in the visible portion of the electromagnetic spectrum. The camera can be configured to capture images in the infrared portion of the electromagnetic spectrum. For example, the camera can be an infrared (IR) camera. The camera can be configured to detect thermal energy. The sensor(s) 211 can include a light detection and ranging (LIDAR) sensor. The LIDAR sensor can be configured to emit a laser light and measure the time for the reflected light to return. The LIDAR sensor can be configured to determine distances between the LIDAR sensor and a point remote to the LIDAR sensor and/or between two points remote to the LIDAR sensor. In some implementations, the sensor(s) 211 can include a camera and a LIDAR sensor. In some implementations, the sensor(s) 211 can include multiple cameras and/or multiple types of cameras. The sensor(s) 211 can include a microphone configured to detect sounds such as voice, speech, crying, etc. The sensor(s) 211 can include a motion sensor or light sensor.

The soundbar 201 can include one or more speakers 213. The speaker(s) 213 can emit one or more audio signals such as music, voice commands, physiological information such as health parameters, alarms, and the like. The speaker(s) 213 can include one or more of tweeters, woofers, and/or subwoofers.

The soundbar 201 may be in communication with one or more servers 227 remote to the soundbar 201. The soundbar 201, or communication component 207 thereof, can communicate with the server(s) 227 via a network 210. The network 210 can include any combination of networks, such as a personal area network (PAN), a local area network (LAN), a metropolitan area network (MAN), a wide area network (WAN), or the like. The soundbar 201 may, via the network 210, communicate data to the server(s) 227 and/or receive data from the server(s) 227 including sensor data such as image data, physiological data (e.g., to be stored as historical physiological data), or the like.

The server(s) 227 may include, and/or have access to (e.g., be in communication with) a storage device or system which can include any computer readable storage medium and/or device (or collection of data storage mediums and/or devices), including, but not limited to, one or more memory devices that store data, including without limitation, dynamic and/or static random access memory (RAM), programmable read-only memory (PROM), erasable programmable read-only memory (EPROM), electrically erasable programmable read-only memory (EEPROM), optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. In some implementations, the server(s) 227 may include and/or be in communication with a hosted storage environment that includes a collection of physical data storage devices that may be remotely accessible and may be rapidly provisioned as needed (commonly referred to as "cloud" storage). Data stored in and/or accessible by the server(s) 227 can include physiological data including historical physiological data previously received from the soundbar 201 and/or sensor data including, for example, images obtained from a camera, or the like. In some implementations, data stored in and/or accessible by the server(s) 227 can include statistical information, such as physiological information relating to a group of people. The statistical information can include information relating to one or more groups of people. The groups can be defined by age, gender, race, nationality, or the like. For example, statistical information can include physiological information relating to adult males living in the United States. As another example, the statistical information can include physiological information relating to infants born in China. The statistical information can include information for large amounts of people and may by representative of large populations, such as adults in the United States. The soundbar 201 may access the statistical information to perform one or more determinations relating to the user such as determining physiological states of the user, such as BMI, body temperature, weight distribution, body measurements, posture, gait, health status, or the like. For example, the processor 203 may compare the user's physiological information with the statistical information.

In some implementations, the soundbar 201 may not be in communication with the one or more server(s) 227 which may enhance security or privacy of sensitive information. In some implementations, the soundbar 201 may selectively communicate certain information with the server(s) 227 and may not communicate other information with the server(s)

227. In some implementations, the soundbar 201 may store sensitive information locally. Sensitive information can include information relating to a user such as physiological information, health information, images of the user, or the like. A user may selectively control which information is communicated from the soundbar 201 to remote computing devices such as the server 227.

In some implementations, the soundbar 201 can include a privacy operation mode which may be implemented using a privacy switch or button. For example, a user may actuate a privacy switch on the soundbar 201 which may implement one or more privacy routines. For example, during a privacy operation mode, communication between the soundbar 201 and the server(s) 227 (or other remote computing devices) may be disabled and/or communication of certain sensitive information between the soundbar 201 and the server(s) 227 may be disabled. In some implementations, during a privacy mode of operation, one or more sensor(s) 211 of the soundbar 201 may be disabled, such as one or more cameras.

The soundbar 201 can communicate with one or more computing devices 221. The computing device 221 may be remote to the soundbar 201. The soundbar 201 may communicate with the computing device 221 via the network 210. The computing device 221 can include one or more of a mobile phone such as a smartphone, a laptop, a tablet, a wearable device such as a smartwatch, a display such as a TV monitor, an earbud, a headphone, an earphone, a sensor such as a physiological sensor, such as a wearable physiological sensor (e.g., worn on a wrist, finger, ear, etc. of the user), another soundbar, or the like. The soundbar 221 may be configured to transmit data such as user interface data for rendering a graphical user interface. The computing device 221 can be configured to render a user interface based on the user interface data received from the soundbar 201. For example, the computing device 221 can render a display on a screen. The user interface can include instructions to a user to perform a measurement, such as instructions to a user to turn around in a circle in front of the sound bar, or to stand still, or the like. The user interface can include physiological data such as physiological parameters, such as a user's 223 weight, height, BMI, or the like. The user interface can include images obtained from a camera of the soundbar 201.

The soundbar 201 may be configured to receive information from the computing device 221. For example, the computing device 221 may transmit instructions to the soundbar 201 to control an operation of the soundbar 201. Accordingly, a user 223 may control operation of the soundbar 201 via the computing device 221 while the user 223 may be remote to the soundbar 201. In one example implementation, the soundbar 201 may monitor a baby. The user 223 may control the soundbar 201, via the computing device 221, to play music via the speakers 213 to help the baby sleep. The soundbar 201 may obtain images of the baby via the sensor(s) 211. The soundbar 201 can transmit the images to the computing device 221. The user 223 can view the images of the baby via the computing device 221 while the user 223 is remote to the baby. The soundbar 201 may receive data such as physiological information form the computing device 221 such as where the computing device 221 includes physiological sensor(s).

In some implementations, the computing device 221 may be associated with another user. For example, the computing device may be associated with a healthcare provider. The soundbar 201 may implement a call, such as a video call or audio call, with the remote computing device 221. The soundbar 201 can communicate image data to the computing device 221. The image data may correspond to historical and/or real time images. The image data may facilitate a video call. The image data may aid a healthcare provider in diagnosing a physiological status of the user. Accordingly, the soundbar 201 can facilitate telehealth.

In some implementations, the soundbar 201 may receive information from the computing device 221 relating to an audio playback modification and/or hearing profile of a user. For example, the computing device 221 can transmit instructions to the soundbar 201 relating to an audio playback modification which may enhance an audio listening experience for the user depending on the user's particular hearing capabilities. The audio playback modifications can include frequency dependent gains such as amplitude adjustments to one or more frequencies in the audio playback signal. The audio playback modifications can include adjusting a phase of the audio playback signal. The audio playback modifications can include adjusting a latency of the audio playback signal. In one example implementation, the computing device 221 can include an earphone, or earbud, or headphone. The earbud can perform one or tests to determine hearing capabilities of the user. For example, the earbud can perform otoacoustic emissions (OAE) to determine a hearing profile or hearing transfer function of the user. The OAE can include distortion product OAE (DP-OAE), spontaneous OAE (S-OAE), and/or transient evoked OAE (TE-OAE). Based on the OAE the earbud may determine one or more audio playback modifications to make to the audio playback signal to personalize the listening experience for the user based on the user's hearing. The earbud can transmit the hearing transfer function and/or the audio playback modifications to the soundbar 201. The soundbar 201 may modify the audio playback signal emitted from its speakers based on the information received from the earbud. This may enhance an audio listening experience for the user because the audio playback is personalized for the user's hearing profile such that the user will hear the audio as it was intended to be heard.

The soundbar 201 can optionally communicate with a scale 225 such as via the network 210. The scale 225 can be configured to obtain physiological information of the user 223. For example, the scale 225 can obtain the user's 223 weight, BMI, body composition including lean muscle mass, fat mass, water mass, or the like. The soundbar 201 may receive physiological information from the scale 225 obtained by the scale 225. The soundbar 201 may communicate instructions to the scale 225 to control operation of the scale 225. For example, the soundbar 201 may communicate instructions to the scale 225 to cause the scale 225 to rotate such as while the user 223 is on the scale 225 to perform measurement of the user 223. The soundbar 201 may receive instructions from the scale 225 to control an operation of the soundbar 201. For example, the soundbar can receive a signal to cause one or more components of the soundbar 201 to activate, such as to cause the sensor(s) 211 to begin operating to generate sensor data.

Additional Implementations

As used herein, "real-time" or "substantial real-time" may refer to events (e.g., receiving, processing, transmitting, displaying etc.) that occur at the same time or substantially the same time (e.g., neglecting any small delays such as those that are imperceptible and/or inconsequential to humans such as delays arising from electrical conduction or transmission). As a non-limiting example, "real-time" may refer to events that occur within a time frame of each other that is on the order of milliseconds, seconds, tens of seconds, or minutes. In some embodiments, "real-time" may refer to events that occur at a same time as, or during, another event.

As used herein, "system," "instrument," "apparatus," and "device" generally encompass both the hardware (for example, mechanical and electronic) and, in some implementations, associated software (for example, specialized computer programs for graphics control) components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 10 degrees, 5 degrees, 3 degrees, or 1 degree. As another example, in certain embodiments, the terms "generally perpendicular" and "substantially perpendicular" refer to a value, amount, or characteristic that departs from exactly perpendicular by less than or equal to 10 degrees, 5 degrees, 3 degrees, or 1 degree.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The section headings used herein are merely provided to enhance readability and are not intended to limit the scope of the embodiments disclosed in a particular section to the features or elements disclosed in that section. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof

What is claimed is:

1. A soundbar for emitting audio and monitoring a physiological health of a user, the soundbar comprising:
    a speaker configured to emit audio, the audio comprising one or more of music, an alert, information relating to a physiology of the user, or instructions to the user;
    a sensor configured to obtain sensor data as the user is within a proximity of the soundbar, the sensor comprising one or more cameras configured to capture electromagnetic radiation including infrared radiation and visible light radiation, the sensor data comprising image data of the user and relating to a physiology of the user; and
    one or more hardware processors configured to:
        determine a distribution of body heat of the user based on at least the image data of the user, the image data comprising infrared image data indicating thermal energy;
        determine a distribution of body weight of the user based on at least the image data of the user, the image data comprising visible light image data; and
        determine a health index of the user from at least the distribution of body weight of the user or the distribution of body heat of the user.

2. The soundbar of claim 1, wherein the sensor comprising the one or more cameras is further configured to obtain the sensor data comprising the image data of the user as the user rotates in front of the soundbar, the image data of the user corresponding to a plurality of portions of the user's body.

3. The soundbar of claim 1, further comprising a communication component configured to communicate with one or more computing devices, the one or more computing devices including a scale configured to measure a weight of the user, wherein the one or more hardware processors is further configured to:
 generate one or more instructions to the scale to cause the scale to rotate as the user stands on the scale; and
 cause the sensor to obtain the sensor data as the scale rotates.

4. The soundbar of claim 1, further comprising a communication component configured to communicate with one or more computing devices, the one or more computing devices including a scale configured to measure a weight of the user, wherein the one or more hardware processors is further configured to:
 access scale data obtained from the scale by the communication component, the scale data including at least a weight of the user; and
 determine the health index of the user based on at least the scale data.

5. The soundbar of claim 4, wherein the scale data further includes at least one or more of a percent body fat of the user, a percent lean muscle mass of the user, a percent water of the user, a BMI of the user, a change in weight of the user, or ECG data of the user.

6. The soundbar of claim 1, wherein the one or more hardware processors is further configured to:
 determine a likelihood the user has an infectious disease based on at least the distribution of body heat of the user, the distribution of body heat of the user indicating a body temperature of the user, the infectious disease comprising a virus.

7. The soundbar of claim 1, wherein the one or more hardware processors is further configured to:
 process the image data to generate PPG data and determine one or more physiological parameters based on the PPG data.

8. The soundbar of claim 1, wherein the one or more hardware processors is further configured to:
 cause the speaker to emit one or more of an instruction to the user or information relating to the health index of the user.

9. The soundbar of claim 1, further comprising a communication component configured to communicate with one or more computing devices, the one or more computing devices including a display, wherein the one or more hardware processors is further configured to:
 generate user interface data for rendering one or more user interfaces comprising indicia of the health index of the user; and
 cause the communication component to communicate the user interface data to the display to render the one or more user interfaces.

10. The soundbar of claim 9, wherein the one or more user interfaces further comprises one or more images corresponding to the image data of the user, the one or more images comprising one or more historical images or one or more real-time images.

11. The soundbar of claim 1, further comprising a communication component configured to communicate with one or more computing devices, the one or more computing devices including a scale configured to measure a weight of the user, wherein the one or more hardware processors is further configured to:
 cause the sensor to turn on or to obtain the sensor data responsive to one or more signals received from the scale by the communication component, the one or more signals generated by the scale responsive to a user standing on the scale.

12. The soundbar of claim 1, wherein the one or more hardware processors is further configured to:
 determine the distribution of body heat of the user based on at least the image data of the user, the image data comprising historical image data or real-time image data; and
 determine the distribution of body weight of the user based on at least the image data of the user, the image data comprising historical image data or real-time image data.

13. The soundbar of claim 1, wherein the one or more cameras comprise one or more of a plurality of cameras, a 3D camera, a depth camera, a stereovision camera, an infrared camera, or a light detection and ranging (LIDAR) sensor.

14. The soundbar of claim 1, wherein the one or more hardware processors is further configured to:
 cause the one or more cameras to adjust a view of the one or more cameras, wherein adjusting the view of the one or more cameras comprises one or more of rotating the one or more cameras, adjusting a zoom of the one or more cameras, pivoting the one or more cameras, tilting the one or more cameras, or panning the one or more cameras.

15. The soundbar of claim 1, wherein the one or more hardware processors is further configured to:
 cause a communication component of the soundbar to implement wireless communication with a remote computing device to establish a video call;
 cause the communication component to transmit the image data of the user to the remote computing device; and
 generate user interface data for rendering one or more user interfaces comprising one or more images received from the remote computing device by the communication component.

16. A method for monitoring a health of a user, the method comprising:
 accessing sensor data originating from a sensor of a soundbar, the sensor comprising one or more cameras configured to capture electromagnetic radiation including infrared radiation and visible light radiation, the sensor data comprising image data of the user and relating to a physiology of the user;
 determining a distribution of body heat of the user based on at least the image data of the user, the image data comprising infrared image data indicating thermal energy;
 determining a distribution of body weight of the user based on at least the image data of the user, the image data comprising visible light image data;
 determining a health index of the user from at least the distribution of body weight of the user or the distribution of body heat of the user; and
 causing a speaker of the soundbar to emit an audio comprising one or more of music, an alert, information relating to the health index, or instructions to the user.

17. The method of claim 16 further comprising:
 generating one or more instructions to a scale to cause the scale to rotate as the user stands on the scale; and
 causing the sensor to obtain the sensor data as the scale rotates.

18. Non-transitory computer-readable media including computer-executable instructions that, when executed by a computing system, cause the computing system to perform operations comprising:
- accessing sensor data originating from a sensor of a soundbar, the sensor comprising one or more cameras configured to capture electromagnetic radiation including infrared radiation and visible light radiation, the sensor data comprising image data relating to a physiology of a user;
- determining a distribution of body heat of the user based on at least the image data of the user, the image data comprising infrared image data indicating thermal energy;
- determining a distribution of body weight of the user based on at least the image data of the user, the image data comprising visible light image data;
- determining a health index of the user from at least the distribution of body weight of the user or the distribution of body heat of the user; and
- causing a speaker of the soundbar to emit an audio comprising one or more of music, an alert, information relating to the health index, or instructions to the user.

19. The non-transitory computer-readable media of claim 18 wherein the computer-executable instructions, when executed by the computing system, further cause the computing system to perform operations comprising:
- generating one or more instructions to a scale to cause the scale to rotate as the user stands on the scale; and
- causing the sensor to obtain the sensor data as the scale rotates.

* * * * *